(12) United States Patent
Akihisa et al.

(10) Patent No.: US 8,511,279 B2
(45) Date of Patent: Aug. 20, 2013

(54) SPARK IGNITION TYPE INTERNAL COMBUSTION ENGINE

(75) Inventors: Daisuke Akihisa, Susono (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 216 days.

(21) Appl. No.: 13/142,975

(22) PCT Filed: Jan. 6, 2009

(86) PCT No.: PCT/JP2009/050264
§ 371 (c)(1),
(2), (4) Date: Jun. 30, 2011

(87) PCT Pub. No.: WO2010/079623
PCT Pub. Date: Jul. 15, 2010

(65) Prior Publication Data
US 2011/0271920 A1  Nov. 10, 2011

(51) Int. Cl.
*F02D 41/06* (2006.01)
(52) U.S. Cl.
USPC ............ 123/399; 123/90.15; 123/179.18
(58) Field of Classification Search
USPC .......... 123/90.15, 399, 403, 345–348, 179.4, 123/179.16, 179.18
See application file for complete search history.

(56) References Cited

U.S. PATENT DOCUMENTS

| | | | |
|---|---|---|---|
| 6,408,806 B2 * | 6/2002 | Sugiyama et al. | 123/90.15 |
| 6,637,386 B2 * | 10/2003 | Murata et al. | 123/90.15 |
| 6,691,655 B2 * | 2/2004 | Aoyama et al. | 123/90.16 |
| 2003/0116131 A1 * | 6/2003 | Majima et al. | 123/406.53 |
| 2003/0213451 A1 | 11/2003 | Aoyama et al. | |

FOREIGN PATENT DOCUMENTS

| | | |
|---|---|---|
| JP | A-64-318 | 1/1989 |
| JP | A-2000-154753 | 6/2000 |
| JP | A-2002-97954 | 4/2002 |
| JP | A-2003-83123 | 3/2003 |
| JP | A-2003-328794 | 11/2003 |
| JP | A-2004-60553 | 2/2004 |
| JP | A-2005-304262 | 10/2005 |
| JP | A-2007-71046 | 3/2007 |
| JP | A-2007-292061 | 11/2007 |
| JP | A-2007-303423 | 11/2007 |
| JP | A-2008-273469 | 11/2008 |

OTHER PUBLICATIONS

International Search Report dated Feb. 24, 2009 in International Application No. PCT/JP2009/050264.
Office Action issued in Japanese Patent Application No. 2010-545678 dated Jul. 5, 2012.

* cited by examiner

*Primary Examiner* — Hai Huynh
(74) *Attorney, Agent, or Firm* — Oliff & Berridge, PLC

(57) ABSTRACT

A spark ignition type internal combustion engine of the present invention is provided with a variable closing timing mechanism which can change a closing timing of an intake valve after suction bottom dead center wherein the amount of intake air fed into a combustion chamber is controlled mainly by changing the closing timing of the intake valve. At the time of engine cold start, the closing timing of the intake valve is advanced compared with the time of engine warm operation. At the time of engine cold start, the air-fuel mixture which is taken into a combustion chamber is blown back into the engine intake passage whereby the air-fuel ratio varies among cylinders, but according to the spark ignition type internal combustion engine of the present invention, it is possible to suppress such variation in the air-fuel ratio among cylinders.

18 Claims, 23 Drawing Sheets

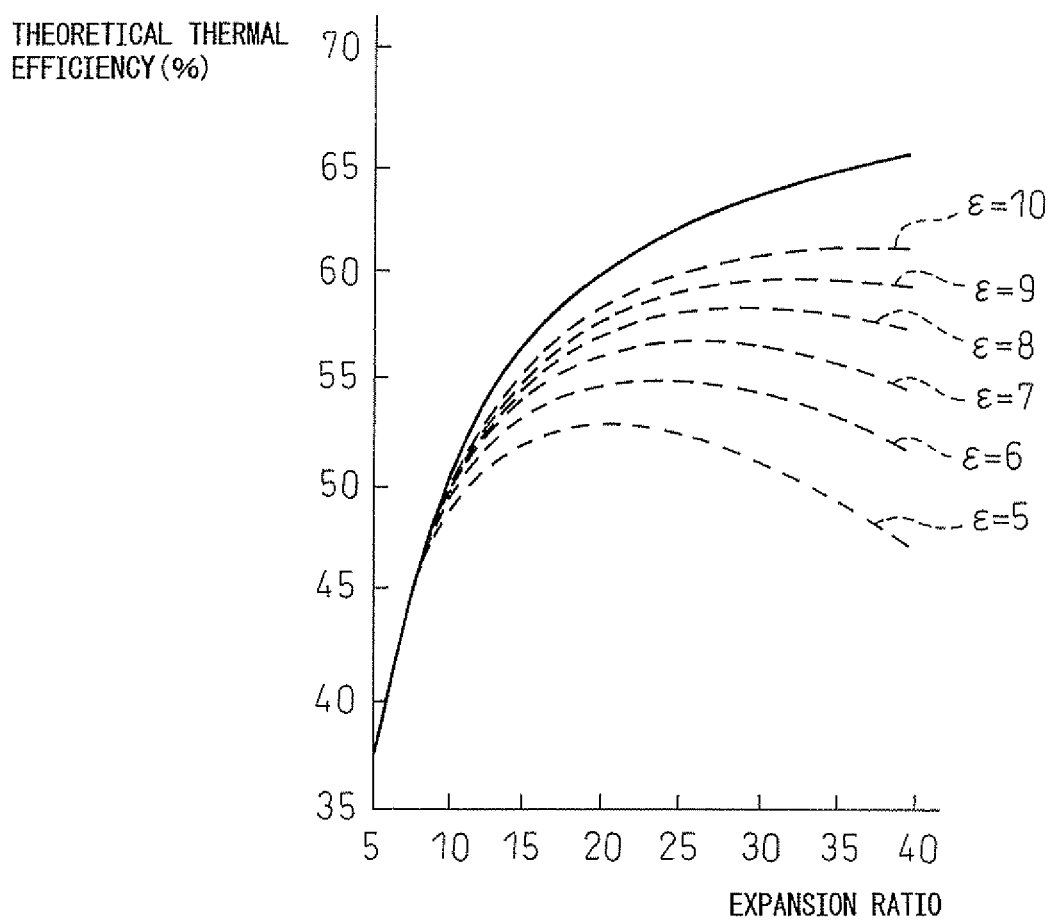

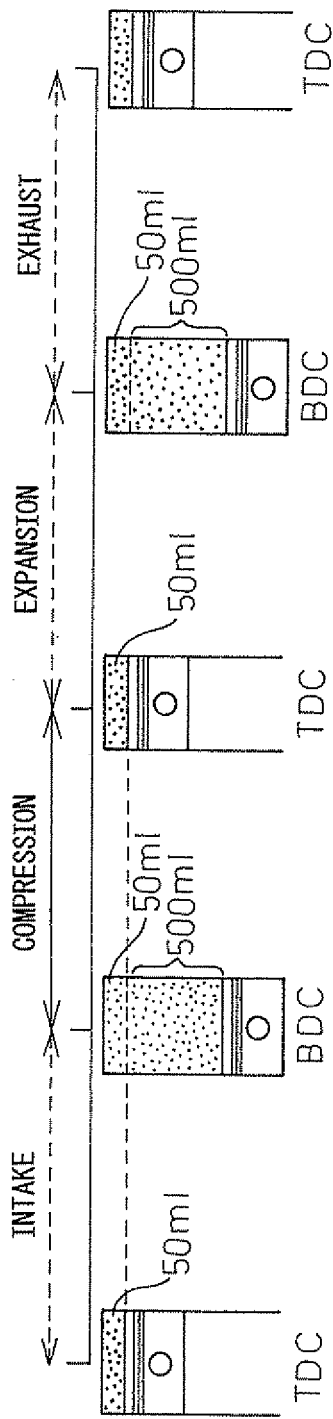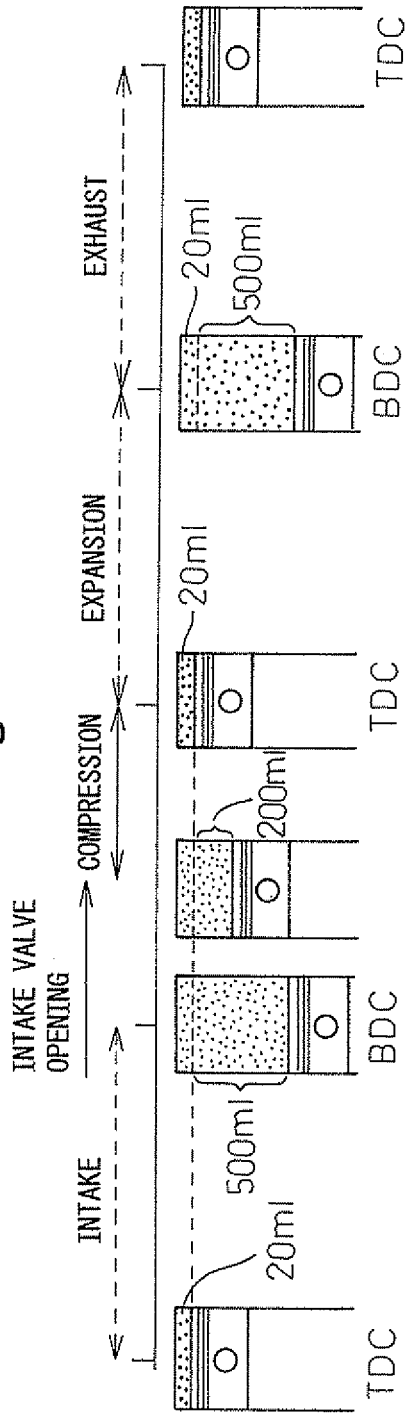

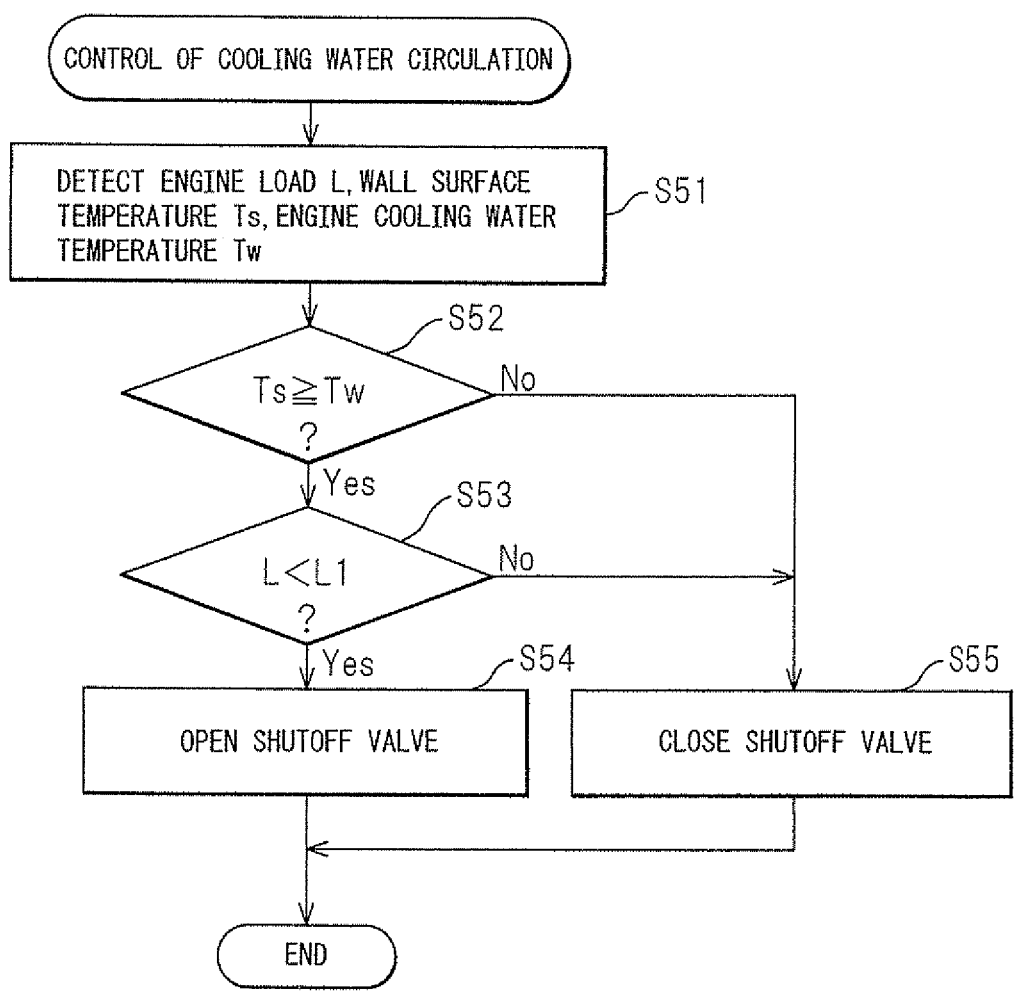

ENGINE COOLING WATER TEMPERATURE AT
TIME OF ENGINE STOP

ENGINE COOLING WATER TEMPERATURE AT
TIME OF ENGINE RESTART

SPARK IGNITION TYPE INTERNAL COMBUSTION ENGINE

TECHNICAL FIELD

The present invention relates to a spark ignition type internal combustion engine.

BACKGROUND ART

The present applicant proposed in Japanese Patent Publication (A) No. 2007-303423 a spark ignition type internal combustion engine which is provided with a variable compression ratio mechanism which can change a mechanical compression ratio and with a variable closing timing mechanism which can change a closing timing of the intake valve and which raises the mechanical compression ratio to 20 or more at the time of engine low load operation compared with at the time of engine high load operation.

In this spark ignition type internal combustion engine, at the time of engine low load operation, by making the mechanical compression ratio (expansion ratio) 20 or more and by making the closing timing of the intake valve a timing away from suction bottom dead center, the actual compression ratio is maintained comparatively low compared with the mechanical actual compression ratio, the occurrence of knocking due to the rise in the actual compression ratio can be suppressed, and an extremely high heat efficiency can be realized.

In this regard, if retarding the closing timing of the intake valve so as to become separate from suction bottom dead center so as to reduce the amount of intake air into a combustion chamber, part of the intake gas which is taken into the combustion chamber once is pushed out by the rising piston and is blown back into the engine intake passage. The amount of intake gas blown back into the engine intake passage becomes greater the more the closing timing of the intake valve is retarded. Further, the strength of the intake gas blown back into the engine intake passage becomes greater the more the closing timing of the intake valve is retarded. In the spark ignition type internal combustion engine which is described in Japanese Patent Publication (A) No. 2007-303420, sometimes the closing timing of the intake valve is retarded to an extreme extent. In such a case, the amount of blowback of intake gas becomes extremely large or the strength of blowback of the intake gas becomes extremely great.

In this way, under conditions where the blowback of intake gas is large and strong, in particular, at the time of engine cold start, deviation occurs in the air-fuel ratio between cylinders (ratio of fuel to air in the combustion chambers).

That is, at the time of engine cold start, the fuel which is injected from a fuel injector is difficult to atomize (or vaporize, below, "atomization" including "vaporization") and parts where the fuel concentration is high and parts where the fuel concentration is low end up being formed in the air-fuel mixture in some cases. However, if the blowback of the air-fuel mixture into the engine intake passage is slight and weak, the blown back air-fuel mixture will not be taken into other cylinders, but will again be taken into the cylinder in question at the next cycle. For this reason, not much deviation occurs in the air-fuel ratio between cylinders.

On the other hand, if the blowback of the air-fuel mixture into the engine intake passage is large and strong, part of the blown back air-fuel mixture will be taken into an adjoining cylinder etc. As explained above, at the time of engine cold start, parts where the fuel concentration is high and parts where the fuel concentration is low are formed in the air-fuel mixture in some cases. In this case, if the air-fuel mixture which is blown back to the inside of the engine intake passage and is taken into an adjoining cylinder is a part with high fuel concentration, the air-fuel ratio of the air-fuel mixture which is taken into this adjoining cylinder etc. will become richer than a target air-fuel ratio while the air-fuel ratio of the air-fuel mixture which is taken into the original cylinder will become leaner than the target air-fuel ratio. Conversely, if the air-fuel mixture which is blown back to the inside of the engine intake passage and is taken into an adjoining cylinder is a part with low fuel concentration, the air-fuel ratio of the air-fuel mixture which is taken into this adjoining cylinder etc. will become leaner than a target air-fuel ratio while the air-fuel ratio of the air-fuel mixture which is taken into the original cylinder will become richer than the target air-fuel ratio. For this reason, deviation will end up occurring in the air-fuel ratio among cylinders.

In this way, at the time of engine cold start, if retarding the closing timing of the intake valve, the blowback of the air-fuel mixture into the engine intake passage becomes greater and stronger whereby deviation will end up occurring in the air-fuel ratio among cylinders.

DISCLOSURE OF INVENTION

Therefore, in consideration of this problem, an object if the present invention is to provide an internal combustion engine in which an amount of intake air is controlled mainly by changing a closing timing of an intake valve wherein the variation in air-fuel ratio among cylinders which can occur at the time of engine cold start is suppressed.

The present invention, as a means for solving this problem, provides a spark ignition type internal combustion engine as described in the claims.

In a first aspect of the present invention, there is provided a spark ignition type internal combustion engine comprising a variable closing timing mechanism which is able to change a closing timing of an intake valve after suction bottom dead center and a throttle valve which is provided in an engine intake passage, wherein an amount of intake air fed into a combustion chamber is controlled mainly by changing the closing timing of the intake valve, wherein at the time of engine cold operation, the closing timing of the intake valve is advanced compared with at the time of engine warm operation and, at that time, the throttle valve is reduced in opening degree.

In a second aspect of the present invention, at the time of engine cold operation, the lower a wall surface temperature of an intake system, the greater the extent by which the closing timing of the intake valve is advanced compared with the time of engine warm operation.

In a fourth aspect of the present invention, at the time of engine cold operation, an extent by which the closing timing of the intake valve is advanced is larger in the case where the engine speed is low compared with the case where it is high.

In a fifth aspect of the present invention, at the time of engine cold operation, an extent by which the closing timing of the intake valve is advanced is larger in the case where the engine load is low compared with the case where it is high.

In a sixth aspect of the present invention, at the time of engine cold operation, an extent by which the closing timing of the intake valve is advanced is larger in the case where a vaporization rate of fuel which is fed to the internal combustion engine is low compared with when it is high.

In a seventh aspect of the present invention, the engine further comprises a variable compression ratio mechanism which is able to change a mechanical compression ratio and the engine raises the mechanical compression ratio at the time of engine cold operation compared with the time of engine warm operation.

In an eighth aspect of the present invention, there is provided a spark ignition type internal combustion engine comprising a variable closing timing mechanism which is able to change a closing timing of an intake valve after suction bottom dead center and a throttle valve which is provided in an engine intake passage, wherein an amount of intake air fed into a combustion chamber mainly controlled by changing the closing timing of the intake valve, wherein the closing timing of the intake valve is restricted to an advanced side from a retarded guard timing and wherein the retarded guard timing at the time of engine cold operation is set to the advanced side compared with the time of engine warm operation, and, at the time of engine cold operation when the closing timing of the intake valve is advanced, the throttle valve is made smaller in opening degree.

In a ninth aspect of the present invention, at the time of engine cold operation, the lower a wall surface temperature of an intake system, the more the retarded guard timing is set to the advanced side compared with the time of engine warm operation.

In a 10th aspect of the present invention, at the time of engine cold operation, the retarded guard timing is set more to the advanced side when the engine speed is low compared to when it is high.

In an 11th aspect of the present invention, at the time of engine cold operation, the retarded guard timing is set more to the advanced side when the engine load is low compared to when it is high.

In a 12th aspect of the present invention, at the time of engine cold operation, the retarded guard timing is set more to the advanced side when a vaporization rate of fuel which is fed to the internal combustion engine is low compared to when it is high.

In a 13th aspect of the present invention, the engine further comprises a variable compression ratio mechanism which is able to change a mechanical compression ratio at the time of engine low load operation compared with the time of engine high load operation.

In a 14th aspect of the present invention, at the time of engine low load operation, the mechanical compression ratio is made the maximum mechanical compression ratio.

In a 15th aspect of the present invention, at the time of engine low load operation, the expansion ratio is made 20 or more.

In a 16th aspect of the present invention, the engine uses an engine cooling water temperature as a value which expresses the wall surface temperature of the intake system.

In a 17th aspect of the present invention, the engine further comprises a cooling water flow path which circulates engine cooling water to a vicinity of at least part of the engine intake passage, and the engine cooling water circulates through the cooling water flow path when the wall surface temperature of the intake system is lower than the engine cooling water temperature.

In an 18th aspect of the present invention, engine cooling water is not allowed to be circulated to the cooling water flow path at the time of engine high load operation even when the wall surface temperature of the intake system is lower than the engine cooling water temperature.

In a 19th aspect of the present invention, the engine further comprises an elapsed time calculating means for detecting the elapsed time from when the internal combustion engine is stopped to when it is restarted, and when the elapsed time which was detected by the elapsed time calculating means is shorter than a predetermined time, it is judged that the internal combustion engine after engine restart is in the middle of engine warm operation.

Below, the present invention will be able to be understood better from the attached drawings and the description of preferred embodiments of the present invention.

BRIEF DESCRIPTION OF DRAWINGS

FIG. 7 is a view showing the relationship between a stoichiometric heat efficiency and expansion ratio.

FIG. 8A and FIG. 8B are views for explaining an ordinary cycle and super high expansion ratio cycle.

FIG. 22 is a flowchart showing a control routine of recirculation control of engine cooling water.

BEST MODE FOR CARRYING OUT THE INVENTION

Figure 1:
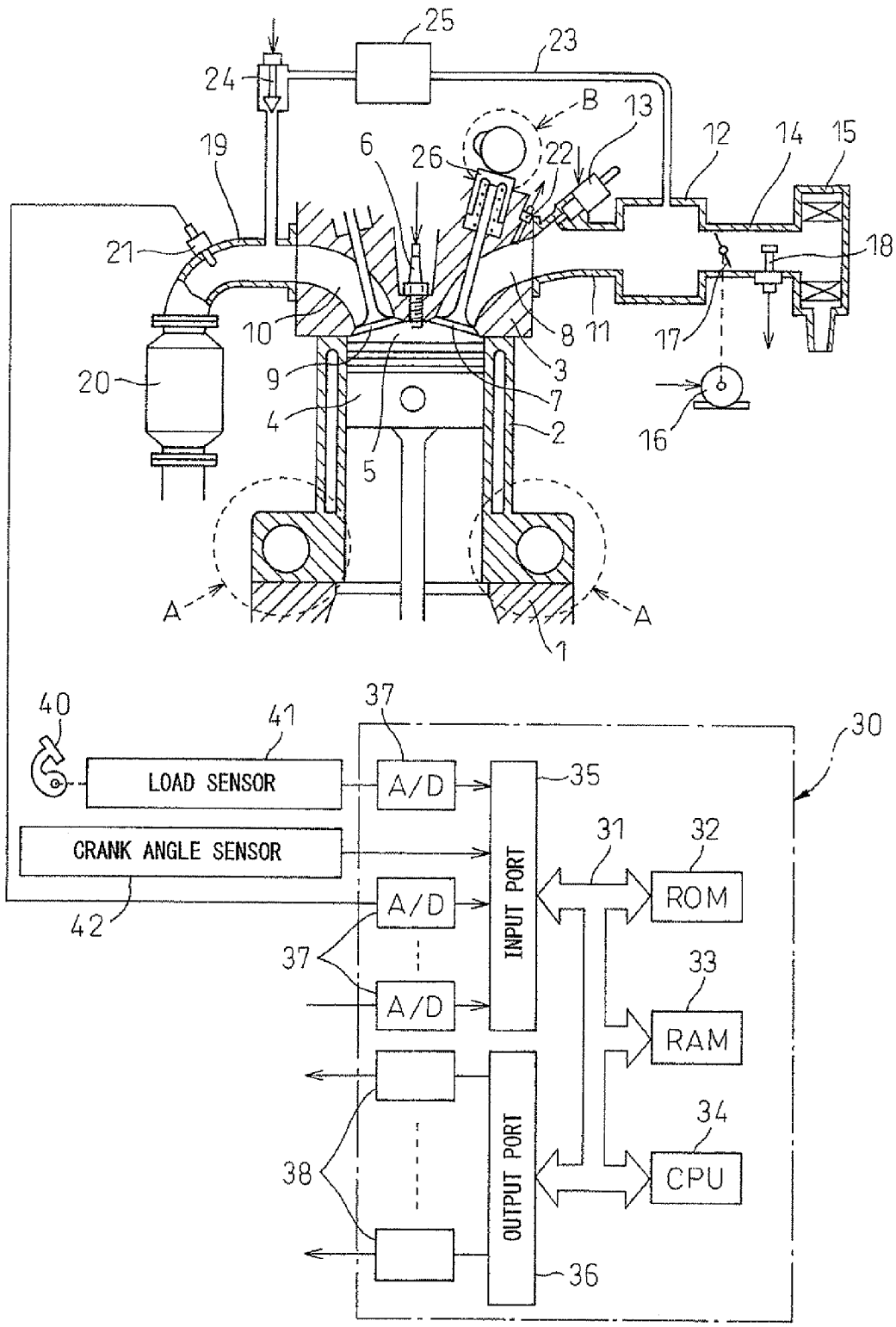
FIG. 1 is an overall view of a spark ignition type internal combustion engine.

Below, embodiments of the present invention will be explained in detail with reference to the drawings. Note that, in the following explanation, similar component elements are assigned the same reference numerals.

FIG. 1 is a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the center of a top surface of the combustion chamber 5, 7 an intake valve, 8 an intake port, 9 an exhaust valve, and 10 an exhaust port. Each intake port 8 is connected through an intake runner 11 to a surge tank 12. The intake runner 11 has a fuel injector 13 arranged in it for injecting fuel toward a corresponding intake port 8. Note that, the fuel injector 13 may also be arranged inside a combustion chamber 5 instead of being attached to the intake runner 11.

The surge tank 12 is connected through an intake duct 14 to an air cleaner 15. In the intake duct 14, a throttle valve 17 driven by an actuator 16 and an intake air detector 18 using for example a hot wire are arranged. On the other hand, each exhaust port 10 is connected through an exhaust manifold 19 to a catalytic converter 20 in which for example a three-way catalyst is built in. Inside the exhaust manifold 19, an air-fuel ratio sensor 21 is arranged. Further, each intake port 8 is provided with a wall surface temperature sensor 22 for detecting the temperature of the wall surface of the intake port 8. The exhaust manifold 19 and the surge tank 12 are connected with each other through an exhaust gas recirculation (below, referred to as "EGR gas") passage 23. Inside this EGR passage 23, an EGR control valve 24 is arranged. Further, around the EGR passage 23, an EGR cooling device 25 for cooling the EGR gas flowing through the inside of the EGR passage 23 is arranged. In the internal combustion engine shown in FIG. 1, engine cooling water is led into the EGR cooling device 25. The engine cooling water is used to cool the EGR gas. Note that, in the following explanation, the intake port 8, intake runner 11, surge tank 12, and intake duct 14 are referred to all together as the "engine intake passage".

On the other hand, in the embodiment shown in FIG. 1, at a connecting part of the crank case 1 and cylinder block 2, a variable compression ratio mechanism A is provided which can change a relative position of the crank case 1 and cylinder block 2 in the cylinder axial direction so as to change the volume of a combustion chamber 5 when a piston 4 is positioned at compression top dead center. Furthermore, a variable valve timing mechanism B is provided which can change a closing timing of an intake valve 7.

An electronic control unit 30 is comprised of a digital computer which is provided with components connected with each other by a bidirectional bus 31 such as a ROM (read only memory) 32, RAM (random access memory) 33, CPU (microprocessor) 34, input port 35, and output port 36. An output signal of the intake air detector 18 and an output signal of the air-fuel ratio sensor 21 are input through respectively corresponding AD converters 37 to the input port 35. Further, an accelerator pedal 40 has a load sensor 41 connected to it which generates an output voltage proportional to the amount of depression of the accelerator pedal 40. The output voltage of the load sensor 41 is input through a corresponding AD converter 37 to the input port 35. Furthermore, the input port 35 has a crank angle sensor 42 which generates an output pulse every time the crankshaft rotates by for example 10°. On the other hand, the output port 36 is connected through corresponding drive circuits 38 to the spark plugs 6, fuel injectors 13, throttle valve drive-use actuator 16, EGR control valve 23, variable compression ratio mechanism A, and variable valve timing mechanism B.

Figure 2:
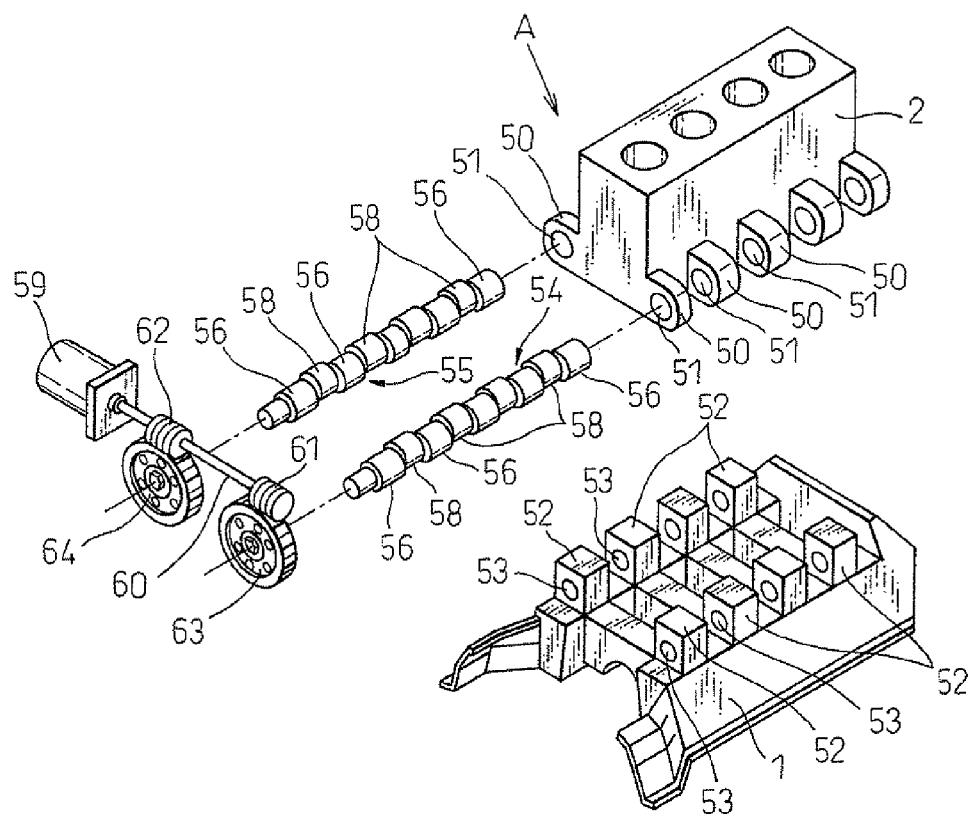
FIG. 2 is a disassembled perspective view of a variable compression ratio mechanism.
Figures 3A, 3B:
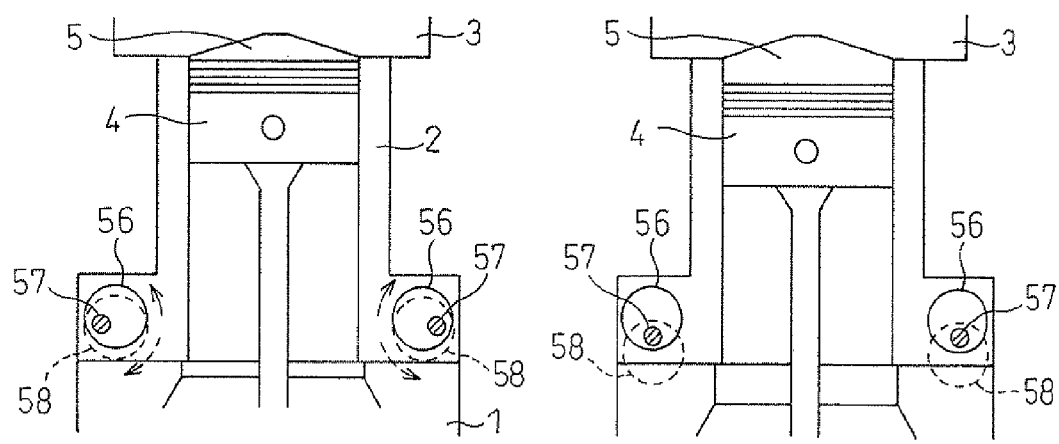
FIG. 3A and FIG. 3B are side cross-sectional views of a schematically illustrated internal combustion engine.

FIG. 2 is a disassembled perspective view of the variable compression ratio mechanism A shown in FIG. 1, while FIG. 3A and FIG. 3B are side cross-sectional views of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3A and FIG. 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 separates from the crank case 1, the volume of the combustion chamber 5 when the piston 4 is positioned at compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
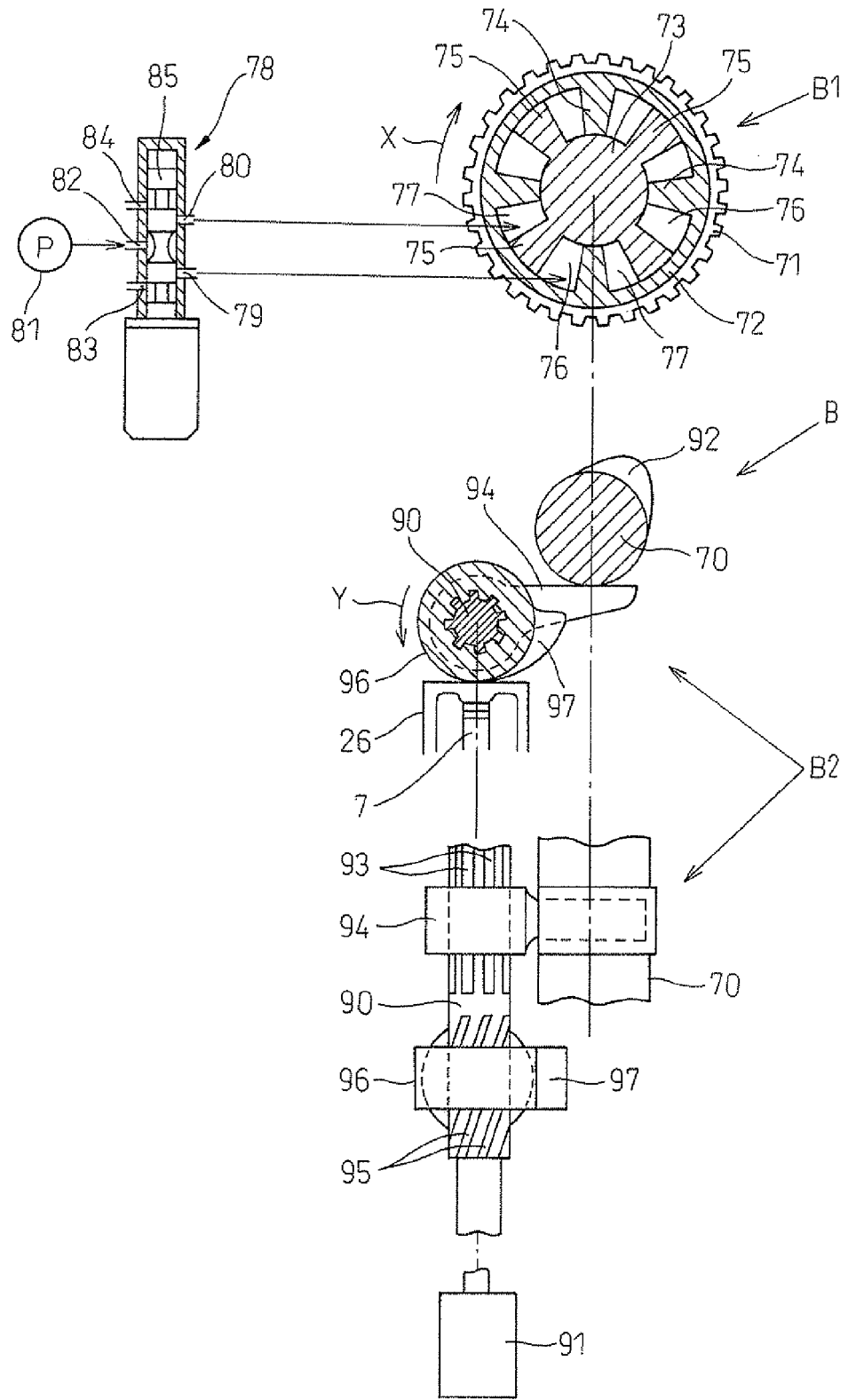
FIG. 4 is a view showing a variable valve timing mechanism.

On the other hand, FIG. 4 shows a variable valve timing mechanism B attached to the cam shaft 70 for driving the intake valve 7 in FIG. 1. As shown in FIG. 4, the variable valve timing mechanism B is comprised of a cam phase changer B1 attached to one end of the cam shaft 70 and changing the phase of the cam of the cam shaft 70 and a cam actuation angle changer B2 arranged between the cam shaft 70 and the valve lifter 26 of the intake valve 7 and changing the working angle of the cams of the cam shaft 70 to different working angles for transmission to the intake valve 7. Note that FIG. 4 is a side sectional view and plan view of the cam actuation angle changer B2.

First, explaining the cam phase changer B1 of the variable valve timing mechanism B, this cam phase changer B1 is provided with a timing pulley 71 made to rotate by an engine crank shaft through a timing belt in the arrow direction, a cylindrical housing 72 rotating together with the timing pulley 71, a shaft 73 able to rotate together with a cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the cam shaft 70, in FIG. 4, the spool valve 85 is made to move downward, working oil fed from the feed port 82 is fed through the hydraulic port 79 to the advancing use hydraulic chambers 76, and working oil in the retarding use hydraulic chambers 77 is drained from the drain port 84. At this time, the shaft 73 is made to rotate relative to the cylindrical housing 72 in the arrow X-direction.

As opposed to this, to retard the phase of the cam of the cam shaft 70, in FIG. 4, the spool valve 85 is made to move upward, working oil fed from the feed port 82 is fed through the hydraulic port 80 to the retarding use hydraulic chambers 77, and working oil in the advancing use hydraulic chambers 76 is drained from the drain port 83. At this time, the shaft 73 is made to rotate relative to the cylindrical housing 72 in the direction opposite to the arrows X.

Figure 5A:
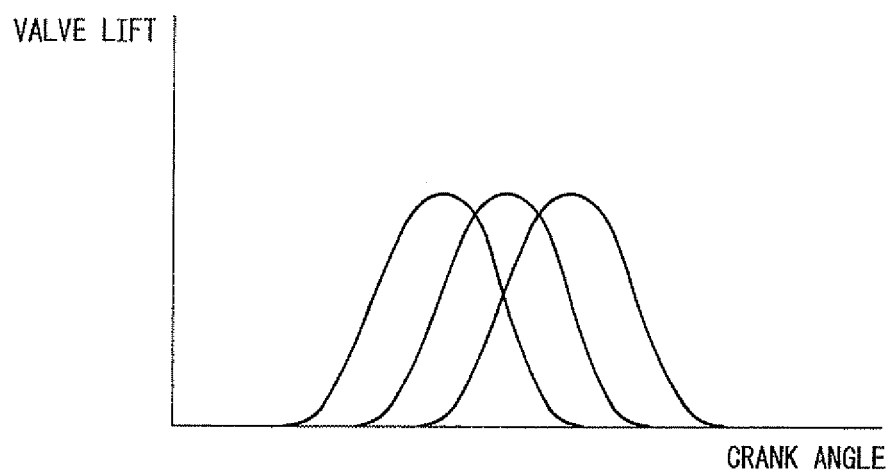
FIG. 5A and FIG. 5B are views showing the amounts of lift of an intake valve and an exhaust valve.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the cam phase changer B1 so as to advance or retard the phase of the cam of the cam shaft 70 by exactly the desired amount as shown in FIG. 5A That is, the cam phase changer B1 can freely advance or retard the opening timing of the intake valve 7.

Next, explaining the cam actuation angle changer B2 of the variable valve timing mechanism B, this cam actuation angle changer B2 is provided with a control rod 90 arranged in parallel with the cam shaft 70 and made to move by an actuator 91 in the axial direction, an intermediate cam 94 engaging with a cam 92 of the cam shaft 70 and slidingly fitting with a spline 93 formed on the control rod 90 and extending in the axial direction, and a rocking cam 96 engaging with a valve lifter 26 for driving the intake valve 7 and slidingly fitting with a spline 95 extending in a spiral formed on the control rod 90. The rocking cam 96 is formed with a cam 97.

When the cam shaft 70 rotates, the cam 92 causes the intermediate cam 94 to rock by exactly a constant angle at all times. At this time, the rocking cam 96 is also made to rock by exactly a constant angle. On the other hand, the intermediate cam 94 and rocking cam 96 are supported immovable in the axial direction of the control rod 90, therefore when the control rod 90 is made to move by the actuator 91 in the axial direction, the rocking cam 96 is made to rotate relative to the intermediate cam 94.

Figure 5B:
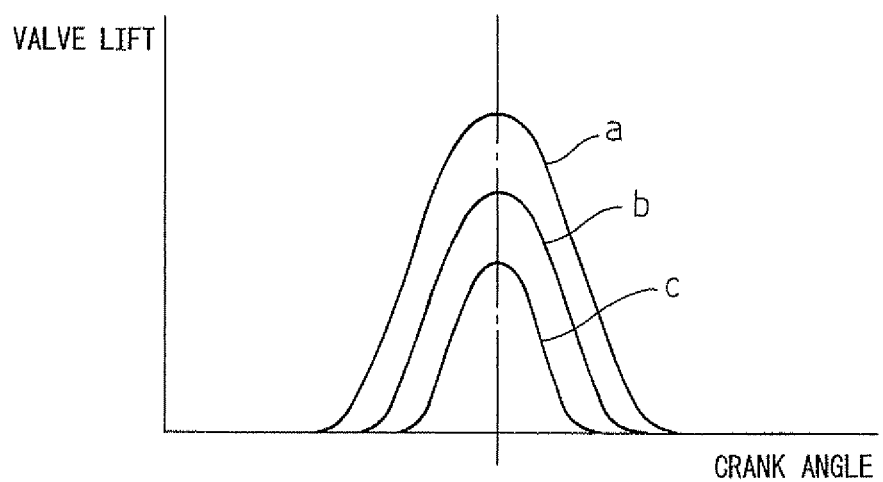

When the cam 92 of the cam shaft 70 starts to engage with the intermediate cam 94 due to the relative rotational positional relationship between the intermediate cam 94 and rocking cam 96, if the cam 97 of the rocking cam 96 starts to engage with the valve lifter 26, as shown by a in FIG. 5B, the opening time and lift of the intake valve 7 become maximum. As opposed to this, when the actuator 91 is used to make the sliding cam 96 rotate relative to the intermediate cam 94 in the arrow Y-direction of FIG. 4, the cam 92 of the cam shaft 70 engages with the intermediate cam 94, then after a while the cam 97 of the rocking cam 96 engages with the valve lifter 24. In this case, as shown by b in FIG. 5B, the opening time and amount of lift of the intake valve 7 become smaller than a.

When the sliding cam 96 is made to rotate relative to the intermediate cam 94 in the arrow Y-direction of FIG. 4, as shown by c in FIG. 5B, the opening time and amount of lift of the intake valve 7 become further smaller. That is, by using the actuator 91 to change the relative rotational position of the intermediate cam 94 and rocking cam 96, the opening time (operating angle) of the intake valve 7 can be freely changed. However, in this case, the amount of the lift of the intake valve 7 becomes smaller the shorter the opening time of the intake valve 7.

The cam phase changer B1 can be used to freely change the opening timing of the intake valve 7 and the cam actuation angle changer B2 can be used to freely change the opening time of the intake valve 7 in this way, so both the cam phase changer B1 and cam actuation angle changer B2, that is, the variable valve timing mechanism B, may be used to freely change the opening timing and opening time of the intake valve 7, that is, the opening timing and closing timing of the intake valve 7.

Note that the variable valve timing mechanism B shown in FIG. 1 and FIG. 4 show an example. It is also possible to use various types of variable valve timing mechanisms other than the example shown in FIG. 1 and FIG. 4. In particular, in this embodiment according to the present invention, so long as a closing timing mechanism which can change the closing timing of an intake valve 7, any type of mechanism may be used. Further, for the exhaust valve 9 as well, a variable valve timing mechanism similar to the variable valve timing mechanism B of the intake valve 7 may be provided.

Figure 6A:
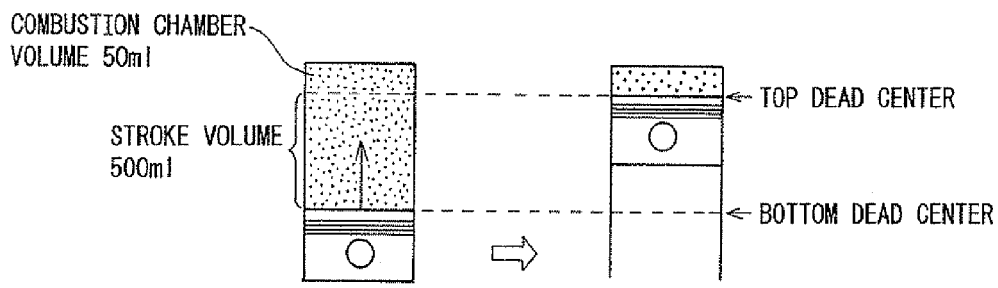
FIG. 6A to FIG. 6C are views for explaining a mechanical compression ratio, actual compression ratio, and expansion ratio.
Figure 6B:
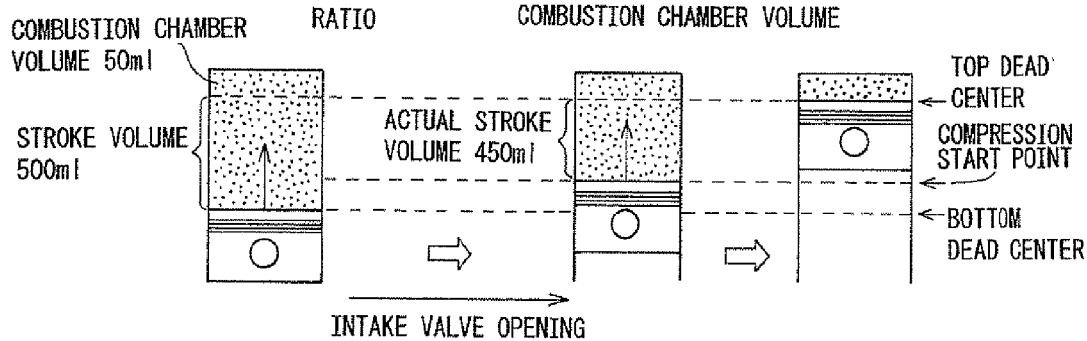
Figure 6C:
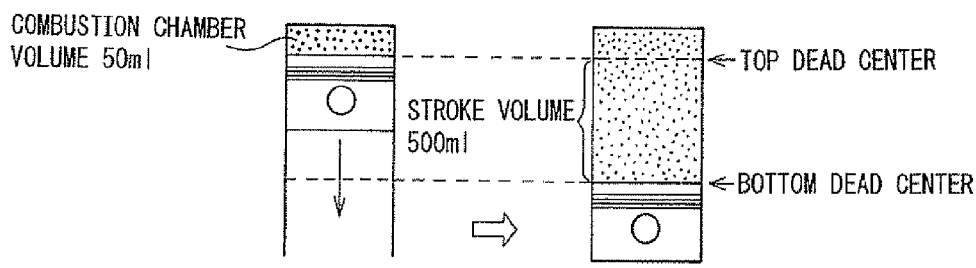

Next, the meaning of the terms used in the present application will be explained with reference to FIG. 6A to FIG. 6C. Note that FIG. 6A to FIG. 6C show for explanatory purposes an engine with a volume of the combustion chambers of 50 ml and a stroke volume of the piston of 500 ml. In these FIG. 6A to FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual combustion ratio. This actual combustion ratio is a value determined from the actual stroke volume of the piston from when the compression action is actually started to when the piston reaches top dead center and the combustion chamber volume. This actual combustion ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual combustion ratio is expressed as follows using the actual stroke volume. In the example shown in FIG. 6B, the actual combustion ratio becomes (50 ml+450 ml)/50 ml=10.

FIG. 6C explains the expansion ratio. The expansion ratio is a value determined from the stroke volume of the piston at the time of an expansion stroke and value determined from the combustion chamber volume. This expansion ratio is expressed by the (combustion chamber volume+stroke volume)/combustion chamber volume. In the example shown in FIG. 6C, this expansion ratio becomes (50 ml+500 ml)/50 ml=11.

Next, the most basic features of the present invention will be explained with reference to FIG. 7, FIG. 8A, and FIG. 8B. Note that FIG. 7 shows the relationship between the stoichiometric heat efficiency and the expansion ratio, while FIG. 8A and FIG. 8B show a comparison between the ordinary cycle and super high expansion ratio cycle used selectively in accordance with the load in the present invention.

FIG. 8A shows the ordinary cycle when the intake valve closes near the bottom dead center and the compression action by the piston is started from near substantially compression bottom dead center. In the example shown in this FIG. 8A as well, in the same way as the examples shown in FIG. 6A to FIG. 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual combustion ratio is also about 11, and the expansion ratio also becomes (50 ml+500 ml)/50 ml=11. That is, in an ordinary internal combustion engine, the mechanical compression ratio and actual combustion ratio and the expansion ratio become substantially equal.

The solid line in FIG. 7 shows the change in the stoichiometric heat efficiency in the case where the actual combustion ratio and expansion ratio are substantially equal, that is, in the ordinary cycle. In this case, it is learned that the larger the expansion ratio, that is, the higher the actual combustion ratio, the higher the stoichiometric heat efficiency. Therefore, in an ordinary cycle, to raise the stoichiometric heat efficiency, the actual combustion ratio should be made higher. However, due to the restrictions on the occurrence of knocking at the time of engine high load operation, the actual combustion ratio can only be raised even at the maximum to about 12, accordingly, in an ordinary cycle, the stoichiometric heat efficiency cannot be made sufficiently high.

On the other hand, if strictly differentiating between the mechanical compression ratio and actual combustion ratio and studying raising the stoichiometric heat efficiency, in the stoichiometric heat efficiency, the expansion ratio is dominant, and the stoichiometric heat efficiency is not affected much at all by the actual combustion ratio. That is, if raising the actual combustion ratio, the explosive force rises, but compression requires a large energy, accordingly even if raising the actual combustion ratio, the stoichiometric heat efficiency will not rise much at all.

As opposed to this, if increasing the expansion ratio, the longer the period during which a force acts pressing down the piston at the time of the expansion stroke, and therefore the longer the time that the piston gives a rotational force to the crankshaft. Therefore, the larger the expansion ratio is made, the higher the stoichiometric heat efficiency becomes. The broken line $\epsilon=10$ in FIG. 7 shows the stoichiometric heat efficiency in the case of fixing the actual combustion ratio at 10 and raising the expansion ratio in that state. In this way, it is learned that the amount of rise of the stoichiometric heat efficiency when raising the expansion ratio in the state where the actual combustion ratio is maintained at a low value and the amount of rise of the stoichiometric heat efficiency in the case where the actual combustion ratio is increased along with the expansion ratio as shown by the solid line of FIG. 7 will not differ that much.

If the actual combustion ratio is maintained at a low value in this way, knocking will not occur, therefore if raising the expansion ratio in the state where the actual combustion ratio is maintained at a low value, the occurrence of knocking can be prevented and the stoichiometric heat efficiency can be greatly raised. FIG. 8B shows an example of the case when using the variable compression ratio mechanism A and variable valve timing mechanism B to maintain the actual combustion ratio at a low value and raise the expansion ratio.

Referring to FIG. 8B, in this example, the variable compression ratio mechanism A is used to lower the combustion chamber volume from 50 ml to 20 ml. On the other hand, the suction variable valve timing mechanism B is used to retard the closing timing of the intake valve until the actual stroke volume of the piston changes from 500 ml to 200 ml. As a result, in this example, the actual combustion ratio becomes (20 ml+200 ml)/20 ml=11 and the expansion ratio becomes (20 ml+500 ml)/20 ml=26. In the ordinary cycle shown in FIG. 8A, as explained above, the actual combustion ratio is about 11 and the expansion ratio is 11. Compared with this case, in the case shown in FIG. 8B, it is learned that only the expansion ratio is raised to 26. This will be called the "super high expansion ratio cycle" below.

As explained above, generally speaking, in an internal combustion engine, the lower the engine load, the worse the heat efficiency, therefore to improve the heat efficiency at the time of vehicle operation, that is, to improve the fuel efficiency, it becomes necessary to improve the heat efficiency at the time of engine low load operation. On the other hand, in the super high expansion ratio cycle shown in FIG. 8B, the actual stroke volume of the piston at the time of the compression stroke is made smaller, so the amount of intake air which can be taken into a combustion chamber 5 becomes smaller, therefore this super high expansion ratio cycle can only be employed when the engine load is relatively low. Therefore, in the present invention, at the time of engine low load operation, the super high expansion ratio cycle shown in FIG. 8B is set, while at the time of engine high load operation, the ordinary cycle shown in FIG. 8A is set.

Next, the operational control as a whole will be explained with reference to FIG. 9.

Figure 9:
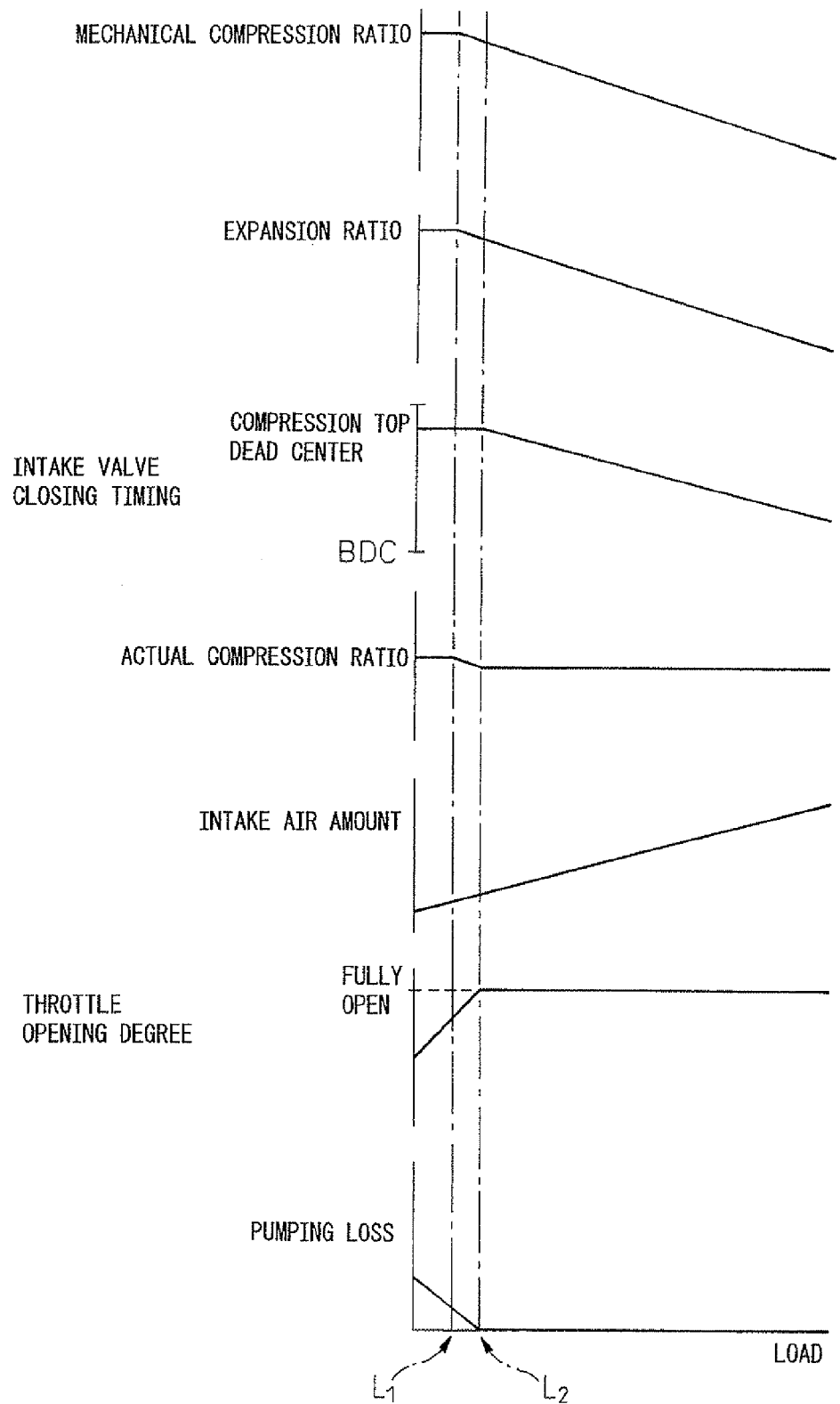
FIG. 9 is a view showing changes in the mechanical compression ratio etc. according to the engine load.

FIG. 9 shows the changes in different parameters in accordance with the engine load at a certain engine speed such as the mechanical compression ratio, expansion ratio, closing timing of the intake valve 7, actual compression ratio, intake air amount, opening degree of the throttle valve 17, and pumping loss. Note that, in the embodiment according to the present invention, a three-way catalyst in the catalytic converter 20 is made able to simultaneously reduce the unburned HC, CO, and $NO_x$ in the exhaust gas usually by having the average air-fuel ratio in a combustion chamber 5 be feedback controlled to the stoichiometric air-fuel ratio based on an output signal of the air-fuel ratio sensor 21.

Now then, as explained above, at the time of engine high load operation, a usual cycle which is shown in FIG. 8A is executed. Therefore, as shown in FIG. 9, at this time, the mechanical compression ratio is made lower, so the expansion ratio is low and the closing timing of the intake valve 7 is made earlier. Further, at this time, the amount of intake air is greater. At this time, the throttle valve 17 is held at a fully open or substantially fully open opening degree, so the pumping loss becomes zero.

On the other hand, as shown in FIG. 9, if the engine load becomes low, along with this the closing timing of the intake valve 7 is made later so as to reduce the amount of intake air. Further, at this time, so that the actual compression ratio is maintained substantially constant, as shown in FIG. 9, as the engine load becomes lower, the mechanical compression ratio is increased. Therefore, as the engine load becomes lower, the expansion ratio is also increased. Note that, at this time as well, the throttle valve 17 is held in the fully opened or substantially fully opened state. Therefore, the amount of intake air which is fed into a combustion chamber 5 is controlled regardless of the throttle valve 17 so as to change the closing timing of the intake valve 7. At this time as well, the pumping loss becomes zero.

In this way, when the engine load becomes lower from the engine high load operating state, under a substantially constant actual compression ratio, the mechanical compression ratio is made to increase as the intake air amount decreases. That is, the volume of a combustion chamber 5 when the piston 4 reaches compression top dead center is decreased proportional to the reduction in the amount of intake air. Therefore, the volume of a combustion chamber 5 when the piston 4 reaches compression top dead center changes proportional to the amount of intake air. Note that, at this time, the air-fuel ratio in a combustion chamber 5 becomes the stoichiometric air-fuel ratio, so the volume of a combustion chamber 5 when a piston reaches compression top dead center changes proportional to the amount of fuel.

If the engine load becomes further lower, the mechanical compression ratio is further increased. If reaching the limit mechanical compression ratio where the mechanical compression ratio becomes the structural limit of a combustion chamber 5, in the region of a lower load than the engine load $L_1$ when the mechanical compression ratio reaches the limit mechanical compression ratio, the mechanical compression ratio is held at the limit mechanical compression ratio. Therefore, at the time of engine low load operation, the mechanical compression ratio becomes maximum and the expansion ratio also becomes maximum. In other words, in the present invention, the mechanical compression ratio is made maximum so that a maximum expansion ratio is obtained at the time of engine low load operation. Further, at this time, the actual compression ratio is held at substantially the same actual compression ratio as at the time of engine medium to high load operation.

On the other hand, as shown in FIG. 9, the closing timing of the intake valve 7 is retarded until the limit closing timing where the amount of intake air which is fed into a combustion chamber 5 can be controlled along with the engine load becoming lower. In the region of a lower load than the engine load $L_2$ when the closing timing of the intake valve 7 reaches the limit closing timing, the closing timing of the intake valve 7 is held at the limit closing timing. If the closing timing of the intake valve 7 is held at the limit closing timing, soon, depending on the change of the closing timing of the intake valve 7, the amount of intake air can no longer be controlled, so some other method must be used to control the amount of intake air.

In the embodiment shown in FIG. 9, at this time, that is, in the region of a lower load than the engine load $L_2$ when the closing timing of the intake valve 7 reaches the limit closing timing, the throttle valve 17 is used to control the amount of intake air which is fed to the inside of a combustion chamber 5. However, if the throttle valve 17 is used to control the amount of intake air, as shown in FIG. 9, the pumping loss is increased.

Note that, to prevent such pumping loss from occurring, in the region of a lower load than the engine load $L_2$ when the closing timing of the intake valve 7 reaches the limit closing timing, in the state holding the throttle valve 17 fully opened or substantially fully opened, the lower the engine load, the greater the air-fuel ratio can be made. At this time, preferably a fuel injector 13 is arranged inside a combustion chamber 5 to perform layered combustion.

As shown in FIG. 9, at the time of engine low load operation, regardless of the engine load, the actual compression ratio is held substantially constant. At this time, the actual compression ratio is set within a range of about ±10 percent with respect to the actual compression ratio at the time of engine medium to high load operation, preferably is set within a range of ±5 percent. Note that, in this embodiment according to the present invention, the actual compression ratio at the time of engine low speed is made substantially 10±1, that is, from 9 to 11. However, if the engine speed becomes higher, the air-fuel mixture in a combustion chamber 5 becomes disturbed, so knocking becomes harder to occur. Therefore, in this embodiment according to the present invention, the higher the engine speed, the higher the actual compression ratio is made.

On the other hand, as explained above, in the super high expansion ratio cycle shown in FIG. 8B, the expansion ratio is made 26. The higher the expansion ratio, the better, but as will be understood from FIG. 7, if 20 or more with regard to the actually possible lower limit actual compression ratio ϵ=5, a considerably high stoichiometric heat efficiency can be obtained. Therefore, in the present invention, the variable compression ratio mechanism A is formed so that the expansion ratio becomes 20 or more.

Further, in the example shown in FIG. 9, the mechanical compression ratio is made to change continuously in accordance with the engine load. However, the mechanical compression ratio can also be made to change in steps in accordance with the engine load.

Figure 10A:
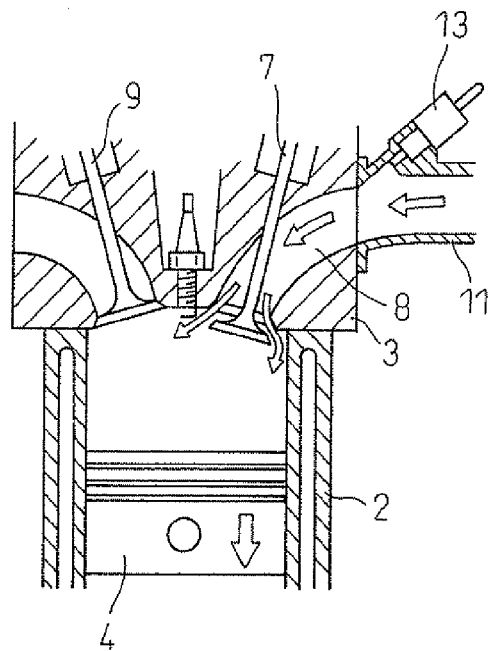
FIG. 10A and FIG. 10B are views showing the state of an air-fuel mixture being blown back from the inside of a combustion chamber to the inside of an engine intake passage.
Figure 10B:
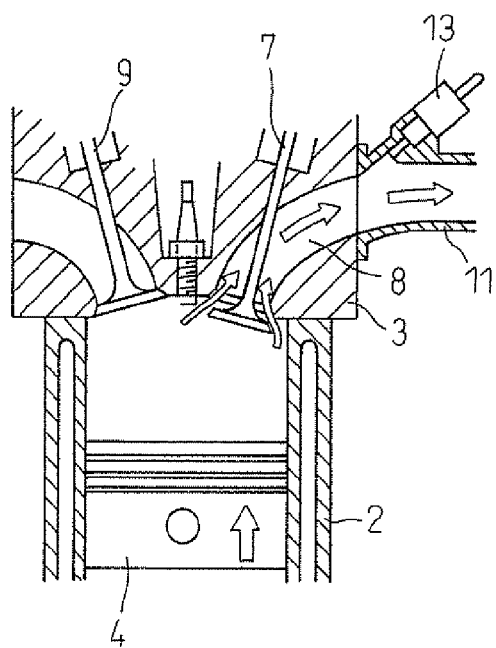

In this regard, when controlling the closing timing of the intake valve to suction bottom dead center on, if retarding the closing timing of the intake valve, part of the air-fuel mixture which was once taken into a combustion chamber 5 will be blown back from the inside of the combustion chamber 5 to an engine intake passage. That is, as shown in FIG. 10A, if the intake valve 7 is opened during the intake stroke, that is, when the piston 4 is descending, the intake gas is taken into the combustion chamber 5 along with the descent of the piston 4. On the other hand, as shown in FIG. 10B, if the intake valve 7 is opened during the compression stroke, that is, when the piston 4 is ascending, part of the air-fuel mixture which was taken into the combustion chamber 5 along with the ascent of the piston 4 is blown back from the inside of the combustion chamber 5 to the engine intake passage.

The amount of the blowback of the air-fuel mixture into the engine intake passage becomes larger the longer the period during which the intake valve 7 is opened during the ascent of the piston 4, that is, the more retarded the closing timing of the intake valve 7. Further, the strength of the blowback of the air-fuel mixture into the engine intake passage becomes greater if the speed of rise of the piston 4 at the time of the closing of the intake valve 7 becomes faster, that is, if the closing timing of the intake valve 7 becomes relatively retarded.

In particular, as explained above, when executing the super high expansion ratio cycle at the time of engine low load operation, the closing timing of the intake valve 7 is retarded by the change of the closing timing of the intake valve 7 until the limit closing timing where the amount of intake air can no longer be controlled. For this reason, the time during which the intake valve 7 is open during the ascent of the piston 4 becomes extremely long and according the blowback of the air-fuel mixture from a combustion chamber 5 into the engine intake passage becomes extremely great and strong.

In this way, if the blowback of the air-fuel mixture from a combustion chamber 5 into the engine intake passage becomes extremely great and strong, at the time of engine cold start, deviation ends up occurring among the cylinders and among the cycles. Below, the reason for this will be explained with reference to FIG. 11A and FIG. 11B.

If the blowback of the air-fuel mixture from a combustion chamber 5 into the engine intake passage becomes extremely great and strong, part of the air-fuel mixture is blown back to the surge tank 12 (that is, the header of the intake runners 11). In this case, part of the air-fuel mixture which is blown back to the surge tank 12 is blown back not into the original cylinder, but for example, in the cylinder adjoining the original cylinder or in the cylinder during the intake stroke when the air-fuel mixture is blown back to the inside of the surge tank 12.

Figure 11A:
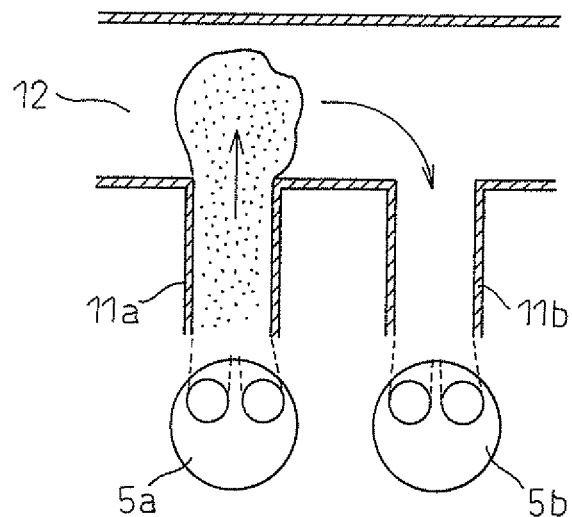
FIG. 11A and FIG. 11B are views for explaining a relationship between blowback of an air-fuel mixture and deviation in engine air-fuel ratio among cylinders.

Here, at the time of engine warm operation (that is, at the time of operation not the time of engine cold start), the temperature of the wall surfaces of the intake port 8, intake runner 11, surge tank 12, and rest of the intake system (below, referred to as the "intake system wall surfaces") and the wall surface of a combustion chamber 5 is high, the fuel which is injected from the fuel injector 13 is easily atomized. For this reason, the air-fuel mixture which is taken into the combustion chamber 5 becomes a substantially uniform mixed of fuel and air. Therefore, as shown in FIG. 11A, for example, even if this air-fuel mixture is blown back through the intake runner 11a to the surge tank 12 and this air-fuel mixture is taken into a cylinder different from the cylinder 5a which is communicated with this intake runner 11a (for example, a cylinder 5b which is communicated with an intake runner 11b), the air-fuel ratio of the air-fuel mixture which is taken into this cylinder 5b will never end up greatly deviating from the target air-fuel ratio. Therefore, there is little variation among cylinders in the air-fuel ratio of the air-fuel mixture which is taken into a combustion chamber 5 at the time of closing of the intake valve 7 (below, referred to as the "engine air-fuel ratio").

Further, since the air-fuel mixture is uniform, the amount of fuel which sticks to the wall surfaces of the intake port 8 and intake runner 11 while the air-fuel mixture is being blown back and flows through the intake port 8 and intake runner 11 becomes substantially uniform between cycles. For this reason, the amount of fuel which sticks to these surfaces at the different cycles is substantially constant and therefore little variation occurs in the engine air-fuel ratio between cycles.

Figure 11B:
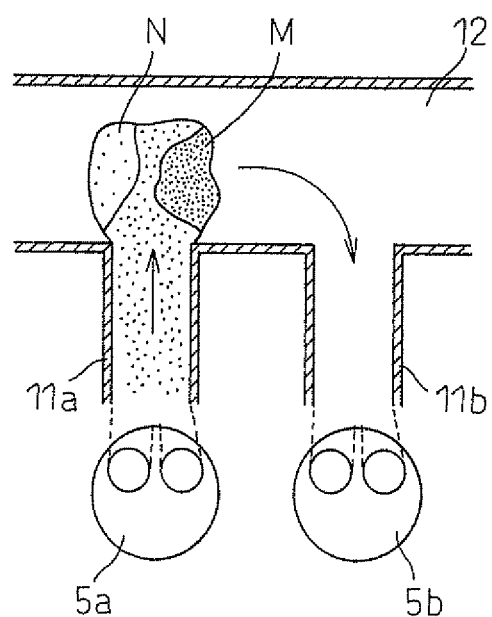

On the other hand, at the time of engine cold start, the temperature of the intake system wall surfaces, wall surfaces of the combustion chambers 5, etc. is low, so the fuel which is injected from a fuel injector 13 becomes hard to atomize. For this reason, the air-fuel mixture which is taken into a combustion chamber 5 will not become a uniform mixture of fuel and air. The air-fuel mixture will end up with parts M of high fuel concentration where drops of fuel remain and parts N of low fuel concentration. Therefore, as shown in FIG. 11B, if the air-fuel mixture which is blown back through the intake runner 11a to the surge tank 12 and is taken into a cylinder different from the cylinder 5a which is communicated with the intake runner 11a (for example, the cylinder 5b which is communicated with the intake runner 11b) is the part M with a high fuel concentration, the air-fuel ratio of the air-fuel mixture which is taken into the this cylinder 5b will become richer than the target air-fuel ratio and the air-fuel ratio of the air-fuel mixture which is taken into the cylinder 5a at the next cycle will become leaner than the target air-fuel ratio. Conversely, if the air-fuel mixture which is blown back through the intake runner 11a to the surge tank 12 and is taken into the cylinder 5b is the part N with a low fuel concentration, the air-fuel ratio of the air-fuel mixture which is taken into the this cylinder 5b will become leaner than the target air-fuel ratio and the air-fuel ratio of the air-fuel mixture which is taken into the cylinder 5a at the next cycle will become richer than the target air-fuel ratio. For this reason, the engine air-fuel ratio will end up varying between cylinders.

Further, the air-fuel mixture has liquid state fuel remaining in it and parts of a high fuel concentration present nonuniformly, so the amount of fuel which sticks to the wall surfaces of the intake port 8 and the intake runner 11 while the air-fuel mixture is blown back and flows through the intake port 8 and intake runner 11 will not become uniform between cycles. For this reason, since the amount of fuel which sticks to these wall surfaces at the different cycles is not constant, the engine air-fuel ratio ends up varying among the cycles.

In this way, if the engine air-fuel ratio varies between cylinders and between cycles, deterioration of the combustion of the air-fuel mixture and deterioration of the fuel economy will be invited.

Therefore, in this embodiment according to the present invention, to suppress the variation between cylinders and between cycles in the engine air-fuel ratio at the time of engine cold start, the retarded guard timing at the time of closing of the intake valve is changed to a more advanced side timing at the time of engine cold operation (in particular, at the time of engine cold start. Below, explained using the time of engine cold start as an example) compared with the time of engine warm operation.

Figure 12:
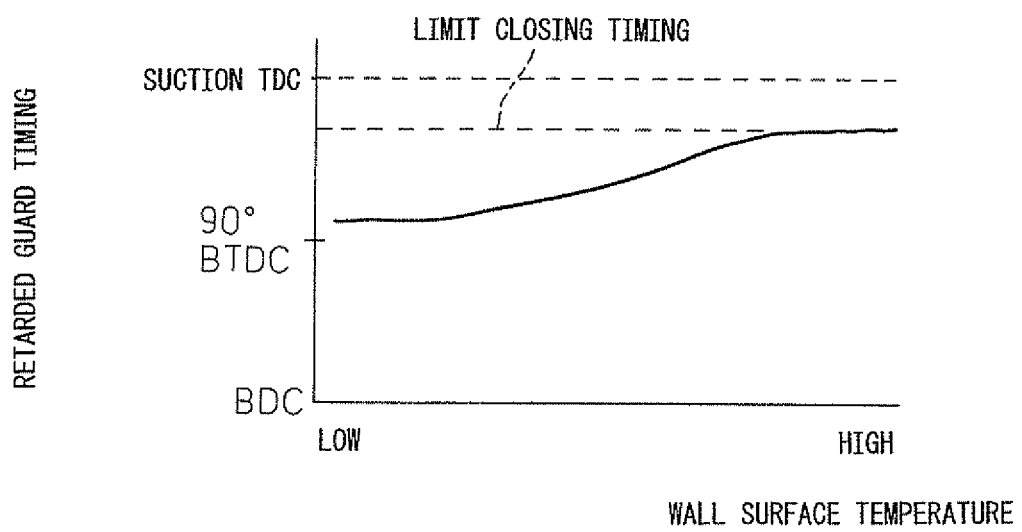
FIG. 12 is a view showing a relationship between an engine cooling water temperature and a retarded guard timing of closing of an intake valve.

FIG. 12 is a view showing the relationship between the intake system wall surface temperature and the retarded guard timing of the closing of the intake valve in the present embodiment. Here, the "retarded guard timing" is the retarded side limit value of the closing timing of the intake valve 7. Accordingly, the range of possible change of the closing timing of the intake valve is restricted to the advanced side from the retarded guard timing. In the engine low load operation region at the time of engine warm operation, the retarded guard timing is made the limit closing timing.

As will be understood from FIG. 12, in the present embodiment, the lower the intake system wall surface temperature, the more to the advanced side the retarded guard timing of the closing of the intake valve is set. In other words, at the time of engine cold start, the extent by which the retarded guard timing of closing of the intake valve is advanced from the time of engine warm operation is made larger the lower the intake system wall surface temperature. In particular, in the region of the lowest intake system wall surface temperature, the retarded guard timing of the closing of the intake valve is made a timing at which intake gas which was once taken into the combustion chamber 5, then returned to the inside of the engine intake passage will not return to the surge tank 12.

By setting the retarded guard timing of the closing of the intake valve in this way, at the time of engine cold start, in particular at the engine low load operation region, the closing timing of the intake valve 7 is advanced compared with the time of engine warm operation.

Figure 13:
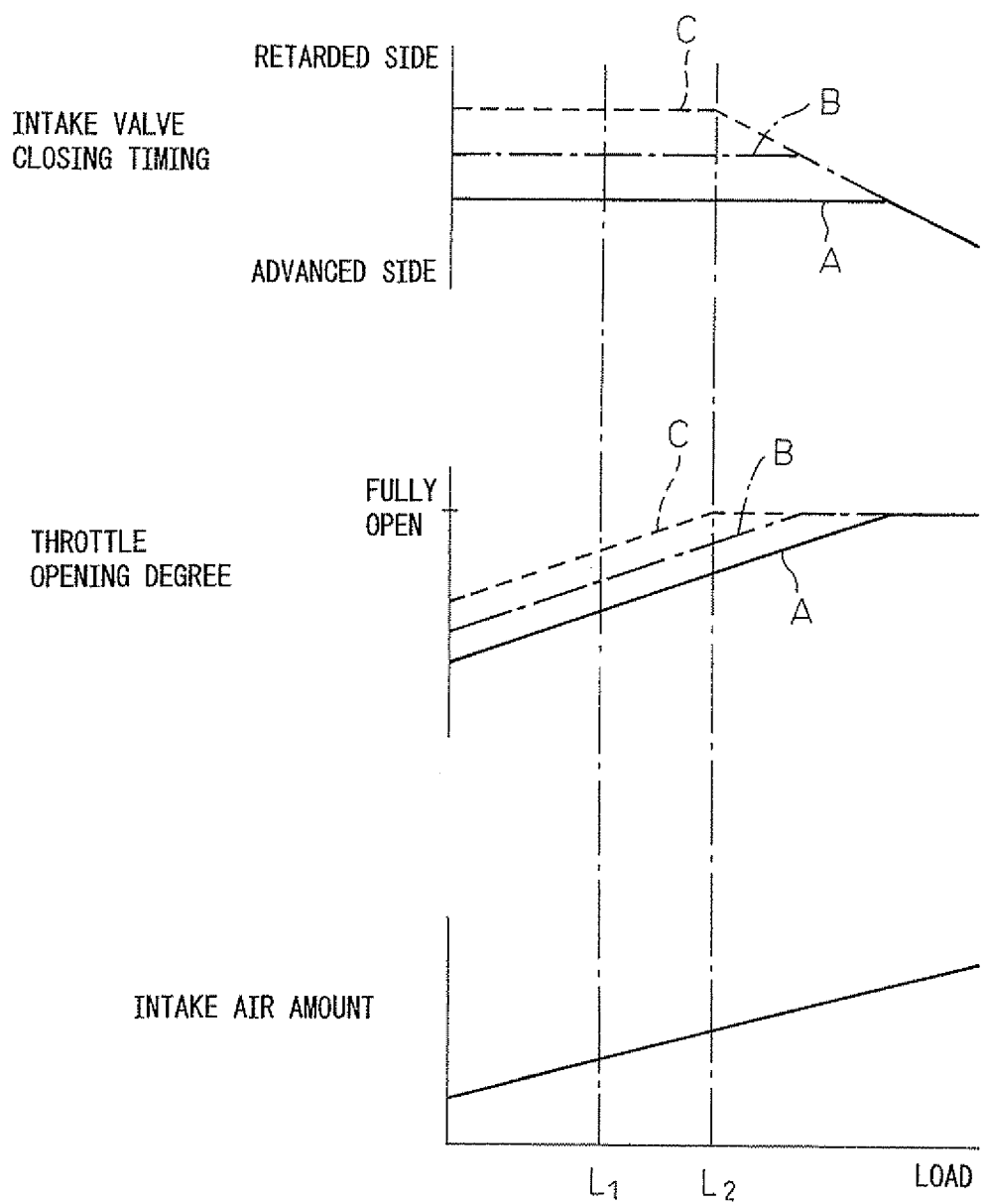
FIG. 13 is a view showing changes in a closing timing of an intake valve 7, a throttle opening degree, and an amount of intake air in accordance with an engine load.

FIG. 13 shows the changes in the closing timing of the intake valve 7, the opening degree of the throttle valve 17, and the amount of intake air in accordance with the engine load in the region of a relatively low engine load. The solid line A in FIG. 13 shows the time of engine cold start where the intake system wall surface temperature is low, the one-dot chain line B shows the time of engine cold start where the intake system wall surface temperature is of a medium extent, and the solid line C shows the changes in the case of completion of warmup (that is, at the time of engine warm operation).

As shown in FIG. 12, when the intake system wall surface temperature is low, the retarded guard timing of the closing of the intake valve is set to the advanced side. For this reason, the closing timing of the intake valve 7 is not made a timing at the retarded side from this retarded guard timing. As a result, as shown in FIG. 13 by the solid line A, in the engine low load operation region, it is set at a timing at the advance side from the time of engine warm operation (broken line C in FIG. 13).

In this way, if the closing timing of the intake valve 7 is set to a timing at the advanced side from the time of engine warm operation in the engine low load operation region, the throttle opening degree is made smaller in accordance with the amount of advance. As a result, the amount of intake air is made an amount substantially the same as the time of engine warm operation even at the time of engine cold start. Conversely, the throttle opening degree is made smaller in accordance with the amount of advance of the closing timing of the intake valve 7 so that the amount of intake air becomes the same amount as the time of engine warm operation even at the time of engine cold start.

Further, if the intake system wall surface temperature becomes higher, as shown in FIG. 12, the retarded guard timing of the closing of the intake valve is changed to the retarded side. For this reason, when the intake system wall surface temperature is a medium extent, the closing timing of the intake valve 7, as shown in FIG. 13 by the one-dot chain line B, is made a timing at the retarded side from the time when the intake system wall surface temperature is the lowest (solid line A in the figure).

Note that, in the present embodiment, the mechanical compression ratio, as shown in FIG. 9, is made to change in accordance with the amount of intake air. Therefore, the mechanical compression ratio is maintained substantially constant regardless of the intake system wall surface temperature if the engine load is the same, that is, if the amount of intake air is the same.

According to the present embodiment, in this way, at the time of engine cold start, the lower the intake system wall surface temperature, the more advanced the closing timing of the intake valve 7 is made, so the harder the fuel which is injected from the fuel injector 13 is to be atomized, that is, the easier it is for variation to occur in the engine air-fuel ratio between cylinders or between cycles due to blowback of the air-fuel mixture from a combustion chamber 5 into the engine intake passage, the closing timing of the intake valve 7 is advanced and, along with this, the smaller and weaker the blowback from the inside of a combustion chamber 5 to the engine intake passage. Due to this, variation in the engine air-fuel ratio between cylinders and between cycles at the time of engine cold start is suppressed and, as a result, deterioration of the combustion of the air-fuel mixture or deterioration of the fuel economy is suppressed.

Note that, in the above embodiment, the closing timing of the intake valve 7 is set in accordance with the intake system wall surface temperature which is detected by the wall surface temperature sensor 22. However, it is also possible not to rely on the wall surface temperature sensor 22, but use the engine cooling water temperature etc. as the basis to estimate the intake system wall surface temperature and use this estimated value as the basis to set the closing timing of the intake valve 7. Alternatively, it is also possible to use the engine cooling water temperature as a value expressing the intake system wall surface temperature and to set the closing timing of the intake valve 7 in accordance with the engine cooling water temperature. Further, it is also possible to set the closing timing of the intake valve 7 in accordance with not only the intake system wall surface temperature, but also other parameters which change in accordance with the atomization properties of the fuel which is injected from a fuel injector 13.

Further, in the above embodiment, the amount of intake air is set constant regardless of the intake system wall surface temperature, but there is no need for it to necessarily be constant. For example, to raise the temperature of the engine body or catalyst, when at the time of engine cold start the amount of feed of fuel is increased, the amount of intake air may also be increased by adjusting the throttle valve. In this case, along with the increase of the amount of intake air, the mechanical compression ratio is made smaller.

Figure 14:
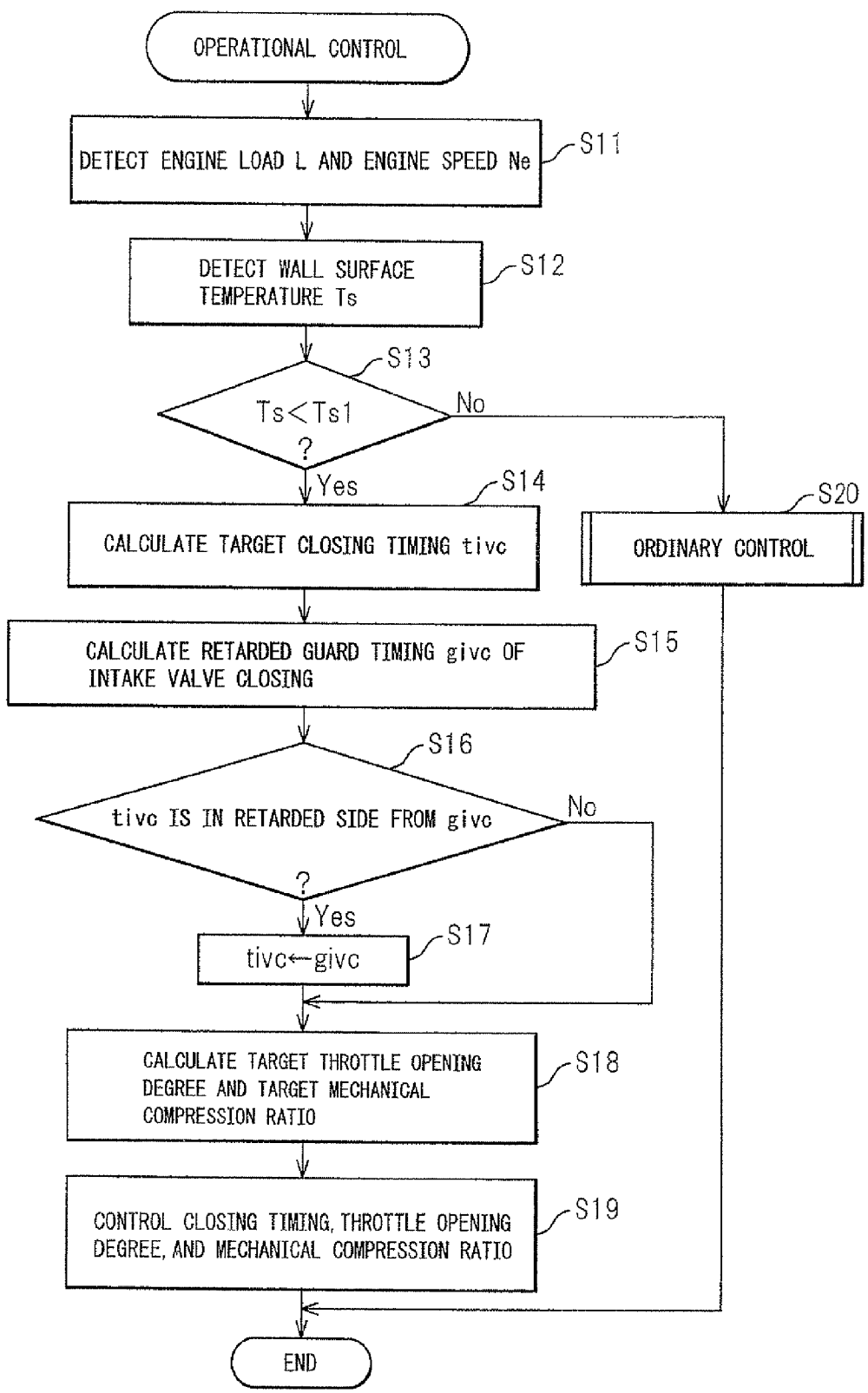
FIG. 14 is a flowchart showing a control routine of operational control of a first embodiment.

FIG. 14 is a flowchart showing of a control routine of the operational control of a first embodiment of the present invention. As shown in FIG. 14, first, at step S11, the outputs of the load sensor 41 and the crank angle sensor 42 are used as the basis to detect the engine load L and engine speed Ne. Next, at step S12, the output of the wall surface temperature sensor 22 which detects the intake system wall surface temperature is used as to basis to detect the intake system wall surface temperature Ts. At step S13, it is judged if the intake system wall surface temperature Ts which is detected at step S12 is lower than a warmup judgment temperature Ts1. The warmup judgment temperature Ts1 is the minimum temperature of the intake system wall surface when the internal combustion engine finishes warming up. At the time of engine cold start, at step S13, it is judged that the intake system wall surface temperature Ts is lower than the warmup judgment temperature Ts1, then the routine proceeds to step S14.

At step S14, the engine load L, engine speed Ne, etc. which were detected at step S11 are used as the basis to calculate the target closing timing tivc of the intake valve 7 using a map etc. Next, at step S15, the intake system wall surface temperature Ts which was detected at step S12 is used as the basis to calculate the retarded guard timing givc of the closing of the intake valve using the map shown in FIG. 12. At step S16, it is judged if the target closing timing tivc of the intake valve 7 which was calculated at step S14 is at the retarded side from the retarded guard timing givc of the closing of the intake valve which was calculated at step S15.

When it is judged at step S16 that the target closing timing tivc of the intake valve 7 is the same timing or at the advanced side from the retarded guard timing givc of closing of the intake valve, step S17 is skipped. On the other hand, when it is judged at step S16 that the target closing timing tivc of the intake valve 7 is at the retarded side from the retarded guard timing givc of the closing of the intake valve, the routine proceeds to step S17. At step S17, the target closing timing tivc is made the retarded guard timing givc of the closing of the intake valve and the routine proceeds to step S18. At step S18, the engine load L which was detected at step S11 and the closing timing of the intake valve 7 tivc which was calculated at step S14 or S17 is used as the basis to calculate the target throttle opening degree, while the engine load L is used as the basis to calculate the target mechanical compression ratio. Next, step S19, the variable valve timing mechanism B, throttle valve 17, and variable compression ratio mechanism A are controlled to give the target closing timing of the intake valve 7 which was detected at step S14 or S17 and the target throttle opening degree and target mechanical compression ratio which were calculated at step S18.

After this if the internal combustion engine finishes warming up, at step S13, it is judged that the intake system wall surface temperature Ts is the warmup judgment temperature Ts1 or more and the routine proceeds to step S20. At step S20, ordinary control is performed.

Next, a second embodiment of the present invention will be explained. The configuration of the spark ignition type internal combustion engine of the second embodiment is basically similar in configuration to the spark ignition type internal combustion engine of the first embodiment. However, in the first embodiment, at the time of engine cold start, the retarded guard timing of closing of the intake valve was changed in accordance with only the intake system wall surface temperature, while in the second embodiment, the closing timing of the intake valve at the time of engine cold start is changed in accordance with not only the intake system wall surface temperature, but also the engine speed, engine load, and fuel properties. Below, referring to FIG. 15 and FIG. 16A to FIG. 16C, the change of the intake valve closing timing in accordance with the engine speed, engine load, and fuel properties will be explained.

Figure 15:
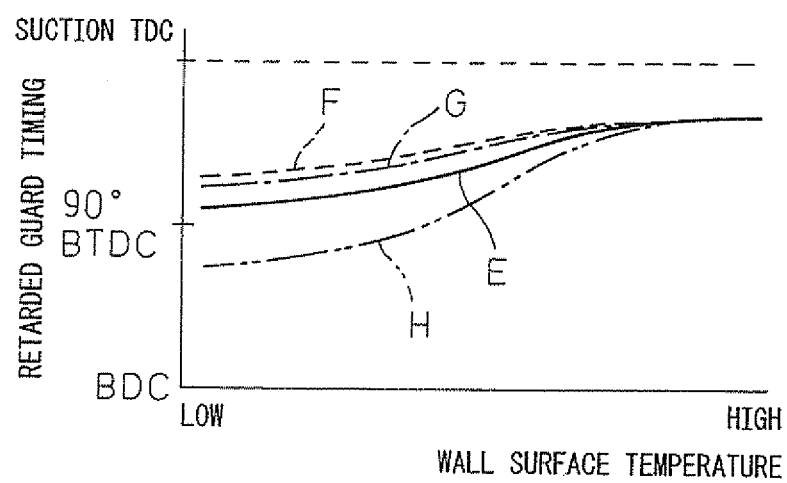
FIG. 15 is a view showing a relationship between an engine cooling water temperature and a retarded guard timing of closing of an intake valve.
Figure 16A:
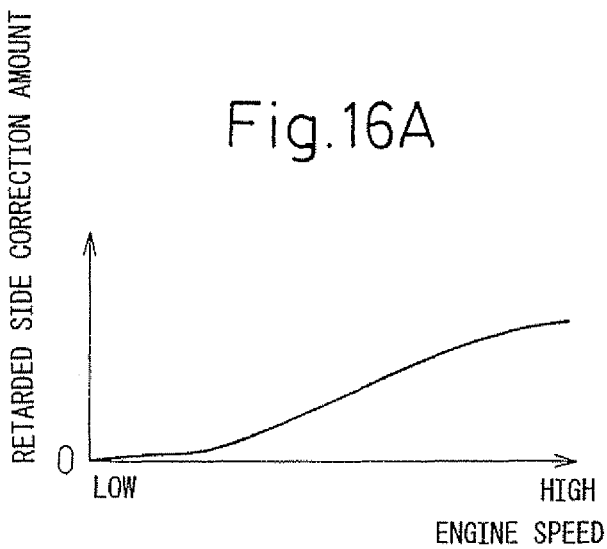
FIG. 16A to FIG. 16C are views showing relationships between an engine speed, engine load, and heavy fuel concentration and a retarded side correction amount.
Figure 16B:
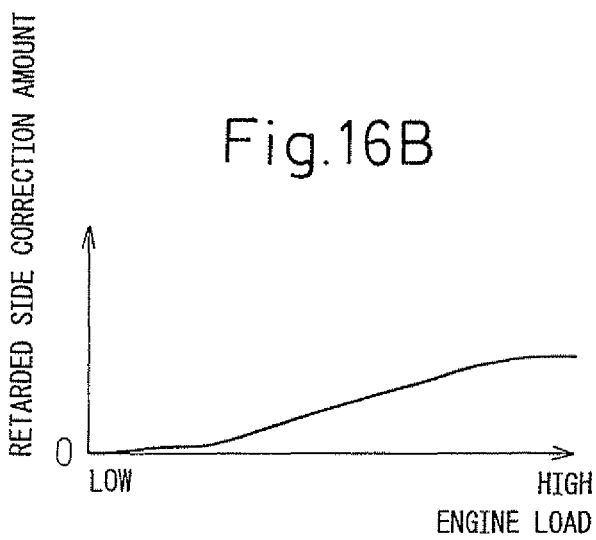
Figure 16C:
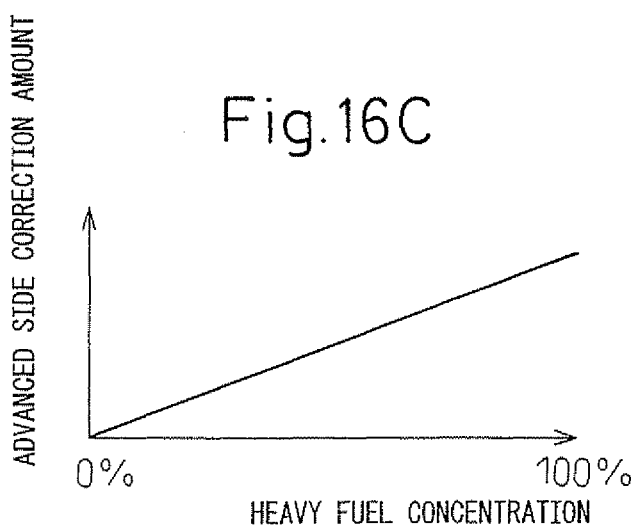

FIG. 15 is a view similar to FIG. 12. In the figure, the solid line E shows the relationship between the intake system wall surface temperature and the retarded guard timing of closing of the intake valve when the engine speed is low and the engine load is low, the broken line F in the figure shows the relationship when the engine speed is high and the engine load is low, the one-dot chain line G in the figure shows the relationship when the engine speed is low and the engine speed is high, and the two-dot chain line H in the figure shows the case where the ratio of the heavy fuel in the fuel is high. Further, FIG. 16A to FIG. 16C show the relationships between the engine speed, engine load, and heavy fuel concentration with the retarded side correction amounts.

As will be understood from FIG. 15, in the present embodiment, at the time of engine cold start, in the same way as the first embodiment, the lower the intake system wall surface temperature, the more to the advanced side the retarded guard timing of closing of the intake valve is set. Further, in the present embodiment, if the engine speed is high (broken line F), the retarded guard timing of closing of the intake valve is corrected to the retarded side compared with the case where the engine speed is low (solid line E). At this time, the retarded side correction amount of the retarded guard timing, as shown in FIG. 16A, is made larger the higher the engine speed. Therefore, the retarded guard timing of closing of the intake valve is set to the advanced side when the engine speed is low compared with when it is high. Note that, the retarded side correction amount of the retarded guard timing is made the correction amount whereby even if correcting the retarded guard timing of closing of the intake valve to the retarded side, the final retarded guard timing becomes a timing at the advanced side from the limit closing timing.

In this way, by setting the retarded guard timing of closing of the intake valve to the advanced side as the engine speed becomes lower, at the engine low load operation region, the closing timing of the intake valve 7 is advanced along with the engine speed becoming lower. That is, in the engine low load operation region, if there is no retarded guard of closing of the intake valve, the closing timing of the intake valve 7 is made the limit closing timing. However, at the time of engine cold start, the closing timing of the intake valve 7 is guarded by the retarded guard timing at the advanced side from the limit closing timing, so in the engine low load operation region, the closing timing of the intake valve 7 is made the retarded guard timing. The retarded guard timing of closing of the intake valve, as explained above, is set to the advanced side as the engine speed becomes lower. As a result, at the time of engine cold start, at the engine low load operation region, the closing timing of the intake valve 7 is advanced as the engine speed becomes lower.

Here, the intake port 8, intake valve 7, piston 4, etc. are shaped so as to facilitate the inflow of intake gas from the engine intake passage to the inside of a combustion chamber 5. Conversely, these shapes are not shapes which facilitate the outflow of intake gas from the combustion chamber 5 to the inside of the engine intake passage. For this reason, the flow resistance when the intake gas flows out from a combustion chamber 5 to the inside of the engine intake passage is larger than the flow resistance when the intake gas flows from the engine intake passage to the inside of the combustion chamber 5. The difference between the flow resistance at the time of inflow of intake gas and the flow resistance at the time of outflow of intake gas becomes larger the higher the flow rate of the intake gas, that is, the higher the engine speed. Therefore, the higher the engine speed, the harder it is for the intake gas in a combustion chamber 5 to flow out into the engine intake passage and the harder it is for the air-fuel mixture which is taken into a combustion chamber 5 once to be blown out from the inside of the combustion chamber 5 to the engine intake passage. In other words, the higher the engine speed, the smaller the effect of retarding of the closing timing of the intake valve 7 on the blowback of the intake gas.

In the present embodiment, the retarded guard timing of closing of the intake valve is set to the advanced side as the engine speed becomes lower. In particular, the closing timing of the intake valve is advanced as the engine speed becomes lower in the engine low load operation region. Therefore, the lower the engine speed and the greater the effect on blowback of the intake gas, the more the closing timing of the intake valve is advanced. Due to this, it is possible to suppress deterioration of the combustion of the air-fuel mixture or deterioration of the fuel economy due to blowback of the intake gas while maintaining a high heat efficiency in the internal combustion engine.

Further, in the present embodiment, when the engine load is high (one-dot chain line G in FIG. 15), compared with when the engine load is low (solid line A in FIG. 15), the retarded guard timing of closing of the intake valve is corrected to the retarded side. At this time, the retarded side correction amount of the retarded guard timing, as shown in FIG. 16B, is made larger the higher the engine load. Therefore, the retarded guard timing of closing of the intake valve in the case where the intake system wall surface temperature is low is set more to the advanced side when the engine load is low compared with when it is high. Note that, in this case as well, in the same way as when changing the retarded side correction amount in accordance with the engine speed, the retarded side correction amount of the retarded guard timing is made a correction amount whereby even if the retarded guard timing of closing of the intake valve is corrected to the retarded side, the final retarded guard timing will become a timing at the advanced side from the limit closing timing.

In this way, by setting the retarded guard timing of closing of the intake valve to the advanced side as the engine load becomes lower, in the engine low load operation region, the closing timing of the intake valve 7 becomes more advanced as the engine load becomes lower. This situation will be explained with reference to FIG. 17.

Figure 17:
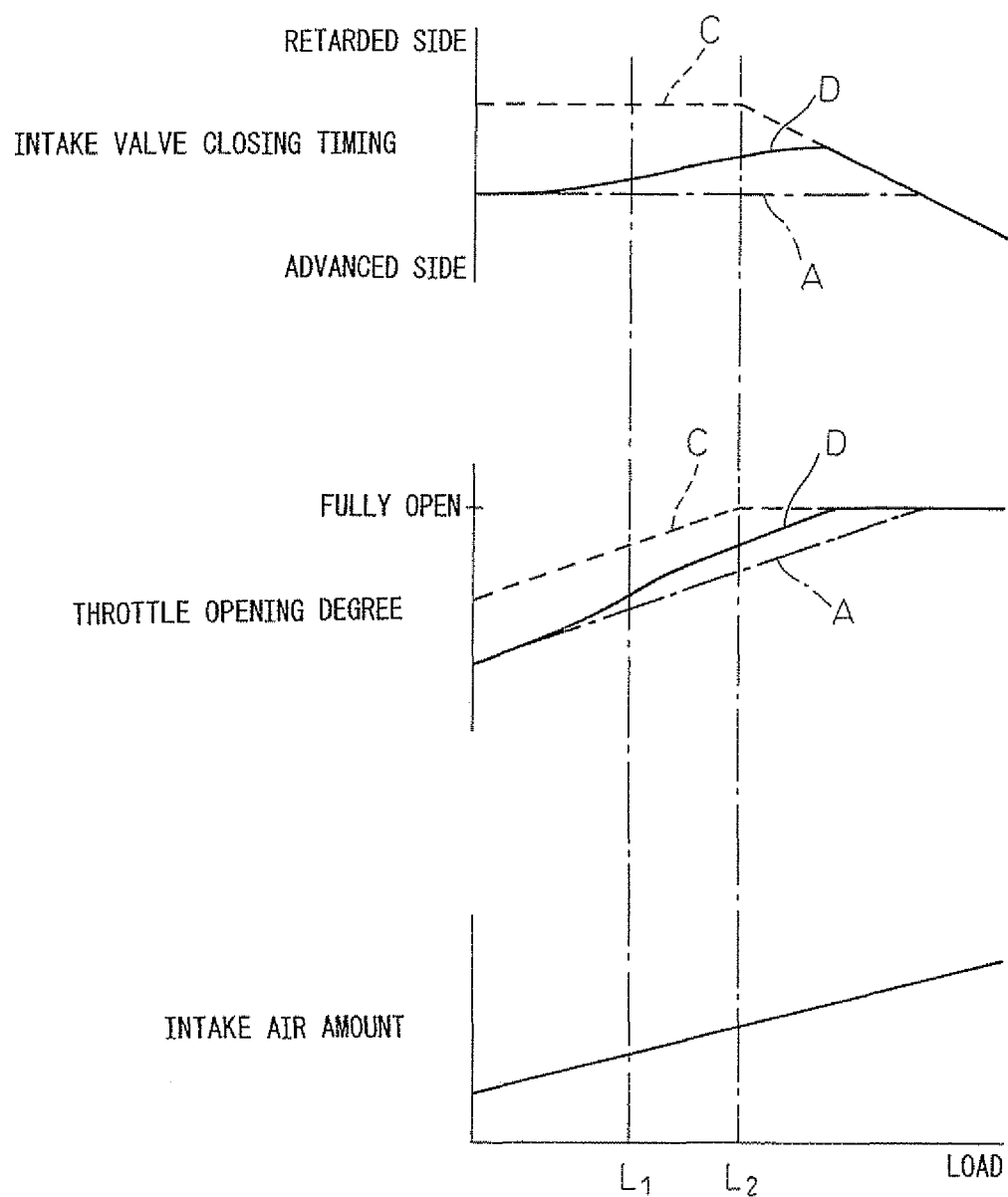
FIG. 17 is a view showing changes in a closing timing of the intake valve 7, a throttle opening degree, and an amount of intake air in accordance with an engine load.

FIG. 17 is a view similar to FIG. 13. In FIG. 17, the solid line D shows the change when changing the retarded guard timing of closing of the intake valve in accordance with the engine load like in the present embodiment, the broken line C shows the change at the time of engine warm operation, and the one-dot chain line A shows the change when not changing the retarded guard timing of closing of the intake valve in accordance with the engine load (case of the first embodiment).

As shown in FIG. 15 and FIG. 16B, in the present embodiment, when the intake system wall surface temperature is low, the retarded guard timing of closing of the intake valve is set to the retarded side as the engine load becomes higher. Further, as explained above, at the time of engine cold start, the closing timing of the intake valve 7 is guarded by the retarded guard timing at the advanced side from the limit closing timing, so at the engine low load operation region, the closing timing of the intake valve 7 is made the retarded guard timing. As a result, at the time of engine cold start, the closing timing of the intake valve 7 at the engine low load operation region, as shown in FIG. 17 by the solid line D, is advanced as the engine load becomes lower.

Note that, in the present embodiment as well, in the same way as the case shown in FIG. 13, if the closing timing of the intake valve is set to a timing at the advanced side from the time of engine warm operation in the engine low load operation region, the throttle opening degree is made smaller in accordance with the advanced amount and, as a result, the amount of intake air is made an amount substantially the same as the time of engine warm operation even at the time of engine cold start.

Here, in general, the lower the engine load, the more the combustion temperature falls. Further, the lower the engine load, the higher the residual gas ratio in the combustion chamber 5. That is, the volume of a combustion chamber at exhaust top dead center does not change in accordance with the engine load. Accordingly, the amount of residual gas in the combustion chamber 5 becomes substantially constant regardless of the engine load. On the other hand, if the engine load becomes lower, the amount of intake gas which is taken into a combustion chamber 5 becomes smaller. For this reason, the ratio of the residual gas in the intake gas in a combustion chamber 5 at the time of closing of the intake valve 7 becomes higher the lower the engine load. In this way, the lower the engine load, the more the combustion temperature falls and the higher the residual gas ratio becomes, whereby the lower the engine load, the harder the air-fuel mixture in a combustion chamber 5 to burn and the easier misfire occurs. Therefore, the lower the engine load, the greater susceptibility to the effects of variation between cylinders and between cycles of the engine air-fuel ratio occurring due to blowback of intake gas.

In the present embodiment, the retarded guard timing of closing of the intake valve is set to the advanced side as the engine load becomes lower. Accordingly, in the engine low load operation region, the lower the engine load, the more the closing timing of the intake valve is advanced, so the higher the engine load and the greater the susceptibility to variation of the engine air-fuel ratio accompanying blowback of the intake gas, the closing timing of the intake valve is advanced. Due to this, it is possible to suppress deterioration of the combustion of the air-fuel mixture due to blowback of the intake gas while maintaining a high heat efficiency in the internal combustion engine.

Further, in the present embodiment, when the concentration of the heavy fuel in the fuel which is injected from a fuel injector 13 is high (two-dot chain line H of FIG. 15), compared to when the concentration of the heavy fuel is low (that is, if the concentration of light fuel in the fuel is high, solid line A of FIG. 15), the retarded guard timing of closing of the intake valve is corrected to the advanced side. At this time, the advanced correction amount of the retarded guard timing, as shown in FIG. 16C, as made larger the higher the concentration of the heavy fuel.

As explained above, at the time of engine cold start, the closing timing of the intake valve 7 is guarded by the retarded guard timing at the advanced side from the limit closing timing, so, in this way, by setting the retarded guard timing of the intake valve to the advanced side as the concentration of the heavy fuel becomes higher, at the time of engine cold start, at the engine low load operation region, the closing timing of the intake valve 7 is advanced as the concentration of the heavy fuel becomes higher.

Here, at the time of engine cold start, the heavy fuel is harder to vaporize than light fuel. Therefore, the higher the concentration of the heavy fuel in the fuel, the worse the vaporization rate of the fuel as a whole. For this reason, when the concentration of the heavy fuel in the fuel is high, if the blowback of the air-fuel mixture from the inside of a combustion chamber 5 to the inside of the engine intake passage is large and strong, the air-fuel ratio ends up varying among the cylinder and among the cycles.

According to the present embodiment, at the time of engine cold start, the higher the concentration of the heavy fuel in the fuel, the more the closing timing of the intake valve 7 is advanced, so the more difficult the atomization of fuel which is injected from a fuel injector 13, that is, the more easily the blowback from the inside of a combustion chamber 5 to the inside of the engine intake passage causes variation in the engine air-fuel ratio among the cylinders or among the cycles, the more the closing timing of the intake valve 7 is advanced and, as a result, the more the deterioration of the combustion of the air-fuel mixture or deterioration of the fuel economy is suppressed.

Note that, the vaporization rate of the fuel as a whole changes in accordance with the properties of the fuel not only when the fuel includes heavy fuel, but also when, for example, the fuel contains ethanol or methanol. For example, when the fuel contains ethanol, the higher the concentration of ethanol in the fuel, the worse the vaporization rate of the fuel as a whole. For this reason, in this case, the higher the concentration of ethanol in the fuel, the larger the advanced correction amount of the retarded guard timing is made.

Therefore, summarizing these, according to the present embodiment, the lower the vaporization rate of the fuel which is injected from the fuel injector 13 at the time of engine cold start (for example, the concentration of heavy fuel, ethanol, methanol, etc. in the fuel), the more the retarded guard timing of closing of the intake valve is advanced. As a result, in the engine low load operation region, the closing timing of the intake valve 7 is advanced.

Note that, in the above embodiment, the case is shown of application of the closing timing of the intake valve 7 to a spark ignition type internal combustion engine enabling a super high expansion ratio cycle, but the internal combustion engine need not necessarily be one which enables a super high expansion ratio cycle. The invention can be applied to any internal combustion engine so long as an internal combustion which controls the amount of intake air by changing the closing timing of the intake valve.

Figure 18:
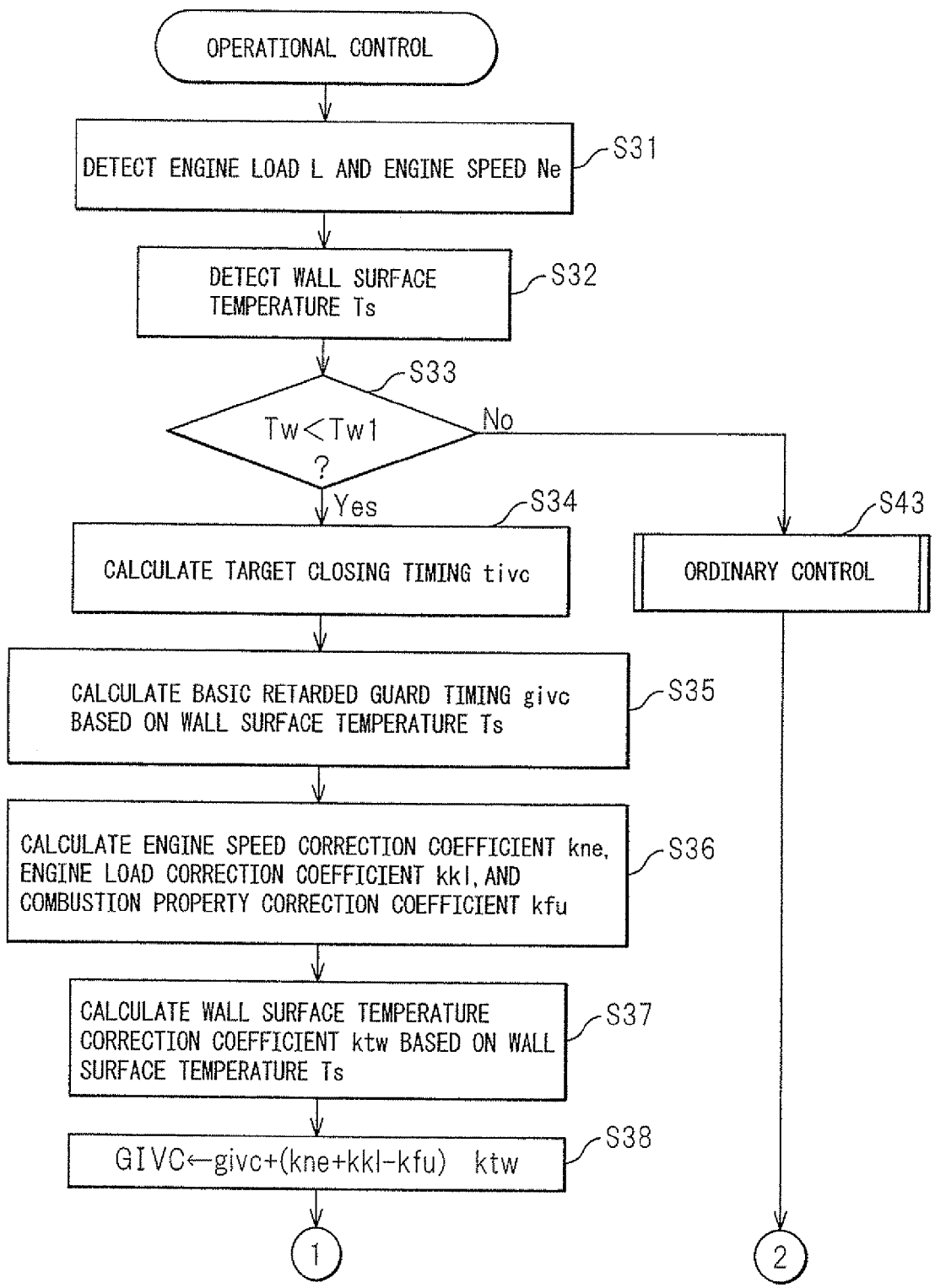
FIG. 18 is a flowchart showing a control routine of operational control of a second embodiment.
Figure 19:
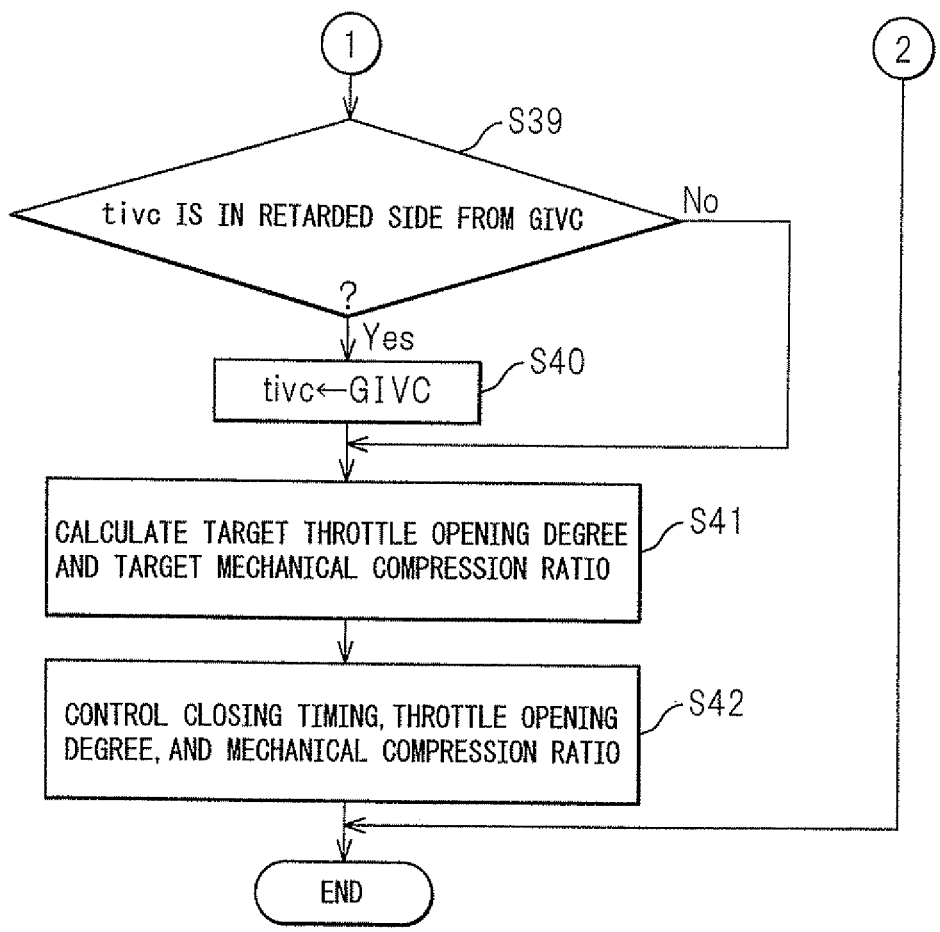
FIG. 19 is a part of a flowchart showing a control routine of the operational control of a second embodiment.

FIG. 18 and FIG. 19 are flowcharts of a control routine of the operational control of a second embodiment of the present invention. Steps S31 to S33 and S41 to S43 of FIG. 18 and FIG. 19 are similar to steps S11 to S13 and S18 to S20 of FIG. 14, so explanations are omitted.

At step S34 of FIG. 18, the engine load L, engine speed Ne, etc. which were detected at step S31 are used as the basis to calculate the target closing timing tivc of the intake valve 7 by using a map etc. Next, at step S35, the intake system wall surface temperature Ts which was detected at step S32 was used as the basis to calculate the reference retarded guard timing givc of the closing of the intake valve using the map etc. shown by the solid line in FIG. 15. Next, at step S36, the engine speed Ne which was detected at step S31 is used as the basis to calculate the engine speed correction coefficient kne using a map such as shown in FIG. 16A, the engine load L which was detected at step S31 was used as the basis to calculate the engine load correction coefficient kkl using a map such as shown in FIG. 16B, and the heavy fuel concentration in the fuel which was detected by a fuel property sensor (not shown) is used as the basis to calculate the fuel property correction coefficient kfu using a map such as shown in FIG. 16C etc.

Next, at step S37, the intake system wall surface temperature Ts is used as the basis to calculate the wall surface temperature correction coefficient ktw. The wall surface temperature correction coefficient ktw is a correction coefficient which becomes gradually smaller than 1 the higher the intake system wall surface temperature Ts and becoming 0 when the internal combustion engine finishes warming up. Next, at step S38, the reference retarded guard timing givc of the closing of the intake valve detected at step S35 is corrected by the following formula (1) by the correction coefficients kne, kkl, kfu, and ktw which were calculated at steps S36 and S37 whereby the corrected retarded guard timing GIVC is calculated.

$$GIVC = givc + (kne + kkl - kfu) \cdot ktw \quad (1)$$

Note that, at the formula (1), it is assumed that the larger the retarded guard timing becomes in value, the more to the retarded side the timing is made.

Next, at step S39, it is judged if the target closing timing tivc of the intake valve 7 which is calculated at step S34 is at the retarded side from the corrected retarded guard timing GIVC of the closing of the intake valve which is calculated at step S38. When it is judged at step S39 that the target closing timing tivc of the intake valve 7 is the same timing as or at the advance side from the corrected retarded guard timing GIVC of the closing of the intake valve, step S40 is skipped. On the other hand, when it is judged at step S39 that the target closing timing tivc of the intake valve 7 is at the retarded side from the retarded guard timing givc of closing of the intake valve, the routine proceeds to step S40. At step S40, the target closing timing tivc is made the corrected retarded guard timing GIVC of closing of the intake valve and the routine proceeds to step S41.

Next, a third embodiment of the present invention will be explained. At the spark ignition type internal combustion engine of the third embodiment, in addition to the configuration of the spark ignition type internal combustion engine of the first embodiment or second embodiment, there is provided a cooling water flow path which can circulate engine cooling water to a vicinity of the engine intake passage.

Figure 20:
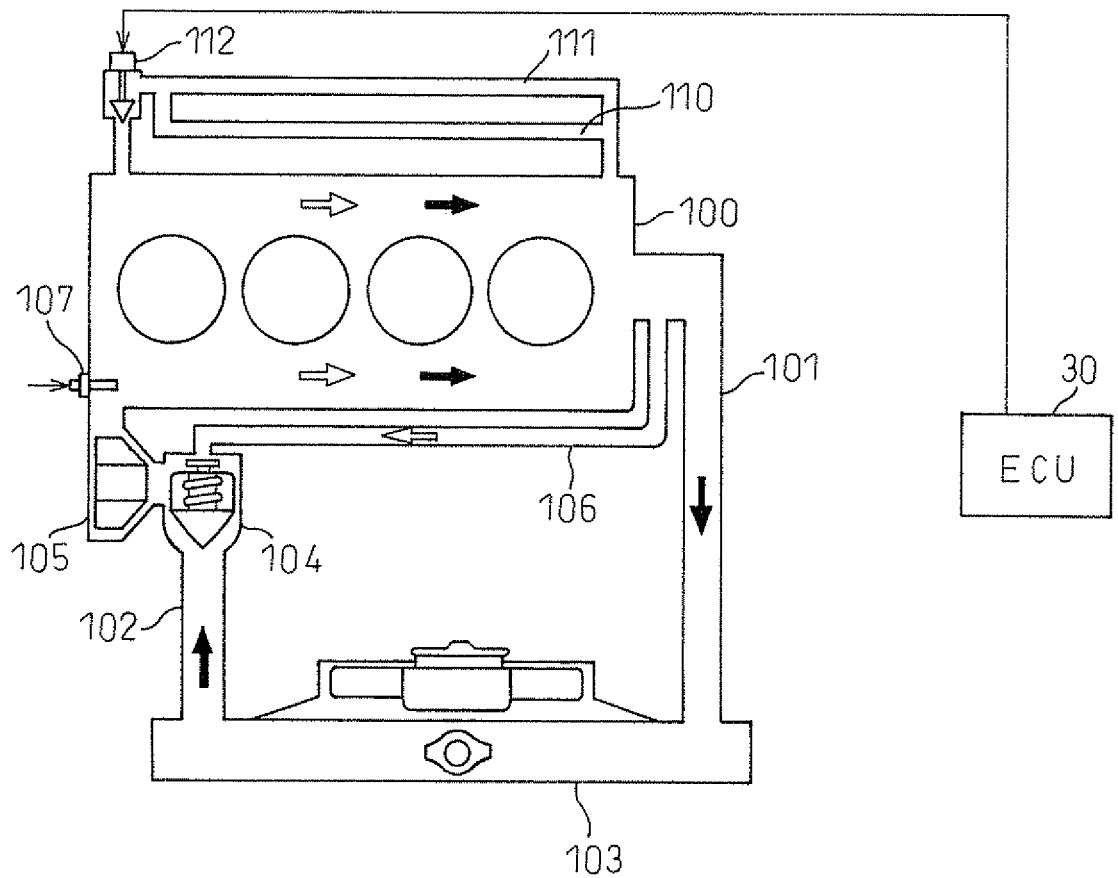
FIG. 20 is a view schematically showing a cooling system of a spark ignition type internal combustion engine of a third embodiment.

FIG. 20 is a view schematically showing a cooling system of a spark ignition type internal combustion engine of the present embodiment. As shown in FIG. 20, the cooling water flow path of the engine body 100 (comprised of the crank case 1, cylinder block 2, and cylinder head 3) is connected through an upstream side connection pipe 101 and a downstream side connection pipe 102 to a radiator 103. Inside the upstream side connection pipe 101, cooling water flows from the cooling water flow path of the engine body 100 toward the radiator 103. Inside the downstream side connection pipe 102, cooling water flows from the radiator 103 toward the cooling water flow path of the engine body 100.

The downstream side connection pipe 3 is provided with a thermostat 104 and a water pump 105. Further, the cooling water flow path of the engine body 100 is provided with a water temperature sensor 107 which detects the temperature of the cooling water flowing through the inside of this cooling water flow path. The output of the water temperature sensor 107 is connected through the A/D converter 37 to the input port 37 of the ECU 30.

The thermostat 104 has a bypass pipe 106 which is branched from the upstream side connection pipe 101 connected to it. The thermostat 104 holds the temperature of the cooling water in the engine body 100 at a constant temperature or more and is closed when the temperature of the cooling water in the engine body 100 is lower than the constant temperature. If the thermostat 104 is closed, the flow of cooling water from the radiator 103 toward the thermostat 104 in the downstream side connection pipe 102 is cut off, therefore cooling water no longer flows through the inside of the radiator 103. Further, if the thermostat 104 is closed, simultaneously the outlet of the bypass pipe 106 to the downstream side connection pipe 102 is opened, whereby the cooling water is made to flow through the bypass pipe 106. That is, if the thermostat 104 is closed, the cooling water flows as shown by the white arrows in FIG. 20.

On the other hand, if the thermostat 104 is opened, flow of cooling water from the radiator 103 toward the thermostat 104 inside the downstream side connection pipe 102 is allowed, therefore the cooling water flows through the inside of the radiator 103. Further, if the thermostat 104 is opened, simultaneously the outlet of the bypass pipe 106 to the downstream side connection pipe 102 is closed, whereby the cooling water no longer flows through the bypass pipe 106. That is, if the thermostat 104 is opened, the cooling water flows as shown by the black arrows in FIG. 20.

In addition, in the spark ignition type internal combustion engine of the present embodiment, two cooling water circulation pipes 110, 111 which are branched from the cooling water flow path in the engine body 10 are provided. At the branched part of these two cooling water flow paths 110, 111 from the cooling water flow path in the engine body 100, a shutoff valve 112 is provided. When the shutoff valve 112 is opened, the cooling water which flows through the cooling water flow path in the engine body 100 flows to the two cooling water flow paths 110, 111, while when the shutoff valve 112 is closed, the cooling water which flows through the cooling water flow path in the engine body 100 is stopped from flowing to the two cooling water flow paths 110, 111. The shutoff valve 112 is connected through the drive circuit 38 to the output port 36 of the ECU 30.

Figure 21:
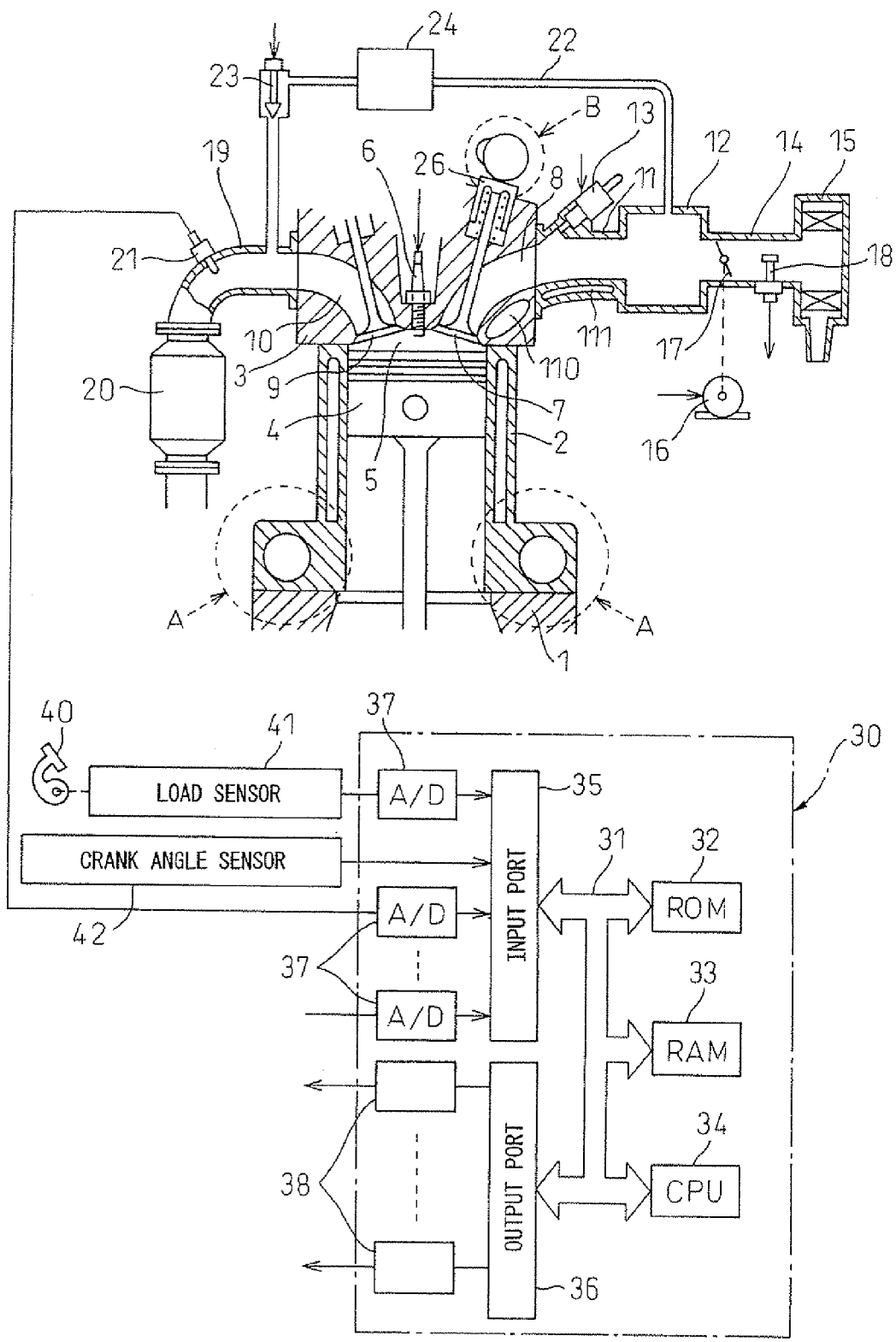
FIG. 21 is a view similar to FIG. 1 and a view giving a side cross-sectional view of a spark ignition type internal combustion engine of a third embodiment.

FIG. 21 is a view similar to FIG. 1 and shows a side cross-sectional view of a spark ignition type internal combustion engine of the present embodiment. As shown in FIG. 20, between the two cooling water flow paths 110, 111, one cooling water flow path 110 is arranged to pass through the vicinity of the intake port 8, while the other cooling water flow path 111 is arranged to pass through the vicinity of the intake runner 11 (below, respectively referred to as the "port-use cooling water flow path 110" and the "runner-use cooling water flow path 111"). Note that, in FIG. 20, the port-use cooling water flow path 110 is arranged outside of the engine body 100, but this is to facilitate understanding of the drawing. In fact, it is arranged inside of the engine body 100.

Further, in the present embodiment, in the engine intake passage, the cooling water flow path is provided in the vicinity of the intake port 8 and intake runner 11, but the cooling water flow path need only be provided at part of the engine intake passage (intake port 8, intake runner 11, surge tank 12, intake duct 14).

In this regard, in an internal combustion engine which stops operating when the vehicle is at a stop, an internal combustion engine which is mounted in a hybrid vehicle which drives the vehicle by an internal combustion engine and an electric motor, etc., after the internal combustion engine is stopped, the internal combustion engine is restarted in a state where the engine cooling water temperature has not fallen that much. In general, the rate of drop of the temperature after stopping the operation of an internal combustion engine is larger at the intake system walls than the engine cooling water. For this reason, in this case, at the time of engine start, the engine cooling water temperature becomes higher than even the intake system wall surface temperature.

Further, when not allowing engine cooling water to circulate to the wall surfaces of the intake system, even at the time of cold start of the internal combustion engine, sometimes the engine cooling water temperature rises faster than the intake system wall surface temperature. That is, the engine cooling water flows in the vicinity of the combustion chamber 5 as well, so directly receives the heat of combustion of the inside of the combustion chamber 5, so the engine cooling water temperature easily rises. On the other hand, the intake runner 11 etc. is arranged away from the combustion chamber 5, so hardly receives any heat of combustion occurring inside the combustion chamber 5 and therefore the wall surface temperature of the intake runners 11 etc. hardly rises. For this reason, at the time of engine cold start, the engine cooling water temperature sometimes becomes higher than the intake system wall surface temperature.

In this way, when the engine cooling water temperature becomes higher than the intake system wall surface temperature, by making the engine cooling water circulate to the port-use cooling water flow path 110 and runner-use cooling water flow path 111, it is possible to make the intake system wall surface temperature quickly rise and maintain it at a high temperature.

Therefore, in the present embodiment, when the intake system wall surface temperature is lower than the engine cooling water temperature, the shutoff valve 112 is opened and engine cooling water is run to the port-use cooling water flow path 110 and the runner-use cooling water flow path 111. Due to this, when the intake system wall surface temperature is low, engine cooling water which is higher in temperature than the intake system wall surface temperature can circulate to the port-use cooling water flow path 110 and the runner-use cooling water flow path 111 and quickly raise the intake system wall surface temperature and the intake system wall surface temperature can be maintained at a relatively high temperature. Further, even when the intake system wall surface temperature is low, when the engine cooling water temperature is lower than the intake system wall surface temperature, the engine cooling water is kept from circulating to the port-use cooling water flow path 110 and the runner-use cooling water flow path 111 so as to prevent the engine cooling water from causing the intake system wall surface temperature to fall.

Further, in the present embodiment, even when the intake system wall surface temperature is lower than the engine cooling water temperature, at the time of engine high load operation, the shutoff valve 112 is closed and engine cooling water is prevented from being circulated to the port-use cooling water flow path 110 and the runner-use cooling water flow path 111.

That is, when the engine load is high, if the temperature of the intake gas which is taken into a combustion chamber 5 is high, the temperature inside of the combustion chamber 5 when the piston 4 is at compression top dead center rises and, as a result, knocking easily occurs. According to the present embodiment, at the time of engine high load operation, engine cooling water can be made to circulate to the port-use cooling water flow path 110 and the runner-use cooling water flow path 111, so the temperature of the intake gas which flows into the combustion chamber 5 is not raised and therefore occurrence of knocking at the time of engine high load operation is suppressed.

Note that, the shutoff valve 112 need not be controlled as explained above continuously during engine operation and may also be controlled as explained above only at the time of the engine cold state. Further, the shutoff valve 112 does not necessarily have to be controlled as explained above. For example, it is also possible to open the shutoff valve 112 when the engine cooling water temperature is a predetermined reference cooling water temperature or more and to close the shutoff valve 112 when the engine cooling water temperature is lower than this reference cooling water temperature. Alternatively, it is also possible to open the shutoff valve 112 when the intake system wall surface temperature is a predetermined reference wall surface temperature or less and to close the shutoff valve 112 when the intake system wall surface temperature is higher than a predetermined reference wall surface temperature.

Alternatively, it is also possible not to provide the shutoff valve 112, but to make the engine cooling water constantly circulate through the port-use cooling water flow path 110 and runner-use cooling water flow path 111.

FIG. 22 is a flowchart showing a control routine of recirculation control of engine cooling water in the present embodiment. As shown in FIG. 22, first, at step S5, a load sensor 41 is used to detect an engine load, a wall surface temperature sensor 22 is used to detect an intake system wall surface temperature Ts, and a water temperature sensor 107 is used to detect an engine cooling water temperature Tw. Next, at step S52, it is judged if the intake system wall surface temperature Ts is the engine cooling water temperature Tw or more. At step S53, it is judged if the engine load is lower than a reference load L1, that is, if the engine operating state is in the engine low to medium load operation state. When it is judged at step S52 and step S53 that the intake system wall surface temperature Ts is the engine cooling water temperature Tw or more and that the engine load L is lower than the reference load L1 (that is, when in the engine low to medium load operation state), the routine proceeds to step S54. At step S54, the shutoff valve 112 is opened and the engine cooling water is made to circulate through the port-use cooling water flow path 110 and runner-use cooling water flow path 111.

On the other hand, when it is judged at step S52 that the intake system wall surface temperature Ts is lower than the engine cooling water temperature Tw or when it is judged at step S53 that the engine load L is the reference load L1 or more (that is, in the engine high load operation state), the routine proceeds to step S55. At step S55, the shutoff valve 112 is closed and the engine cooling water is stopped from circulating to the port-use cooling water flow path 110 and runner-use cooling water flow path 111.

Next, a fourth embodiment of the present invention will be explained. The configuration of the spark ignition type internal combustion engine of the fourth embodiment is basically similar to the configurations of the spark ignition type internal combustion engines of the first embodiment and second embodiment, but in the spark ignition type internal combustion engine of the present embodiment, no wall surface temperature sensor is provided.

In this regard, in the above-mentioned first embodiment and second embodiment, at the time of engine warm operation, that is, when the intake system wall surface temperature Ts is the warmup judgment temperature Ts1 or more, ordinary control is performed, while at the time of engine cold operation, that is, when the intake system wall surface temperature Ts is lower than the warmup judgment temperature Ts1, operational control is performed to advance the retarded guard timing of closing of the intake valve in accordance with the intake system wall surface temperature, engine speed, etc. (below, referred to as "cold control").

However, to find the intake system wall surface temperature, it is necessary to provide a wall surface temperature sensor 22 or estimate the intake system wall surface temperature based on the engine cooling water temperature etc. If providing the wall surface temperature sensor 22, the production cost of the internal combustion engine as a whole increases. If estimating the intake system wall surface temperature based on the engine cooling water temperature etc., the calculated load at the CPU 34 of the ECU 30 ends up increasing. Further, it is also possible to use the engine cooling water temperature as the value showing the intake system wall surface temperature, but the intake system wall surface temperature does not necessarily trend in the same way as the intake system wall surface temperature.

On the other hand, in an internal combustion engine which stops operation at the time when the vehicle is stopped or in an internal combustion engine which is mounted in a hybrid vehicle, an engine is often restarted in a relatively short time from engine stop. In this case, in the period from stop to restart of the internal combustion engine, the intake system wall surface temperature does not fall much. For this reason, cold control is often unnecessary even after restart of the internal combustion engine.

Therefore, in the present embodiment, the wall surface temperature sensor and water temperature sensor 107 are not used. Ordinary control and cold control are switched between based on only the elapsed time from engine stop to start, the elapsed time from engine start, or other elapsed time, while cold control is not executed when the elapsed time from engine stop to start is short.

Figure 23A:
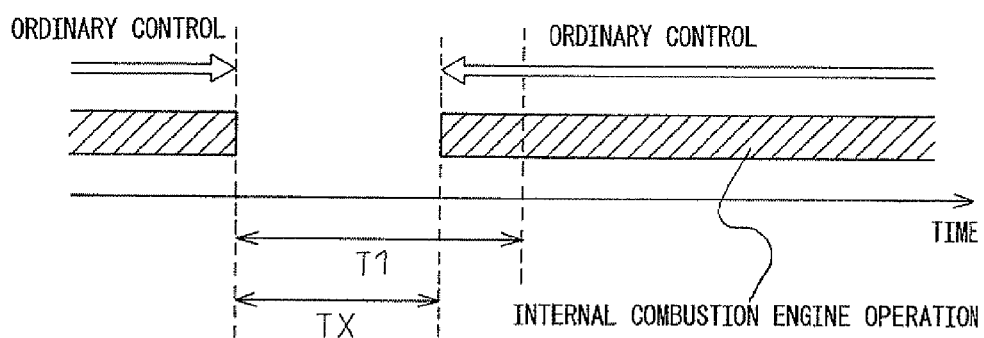
FIG. 23A and FIG. 23B are views schematically showing switching between ordinary control and cold control in accordance with an elapsed time.
Figure 23B:
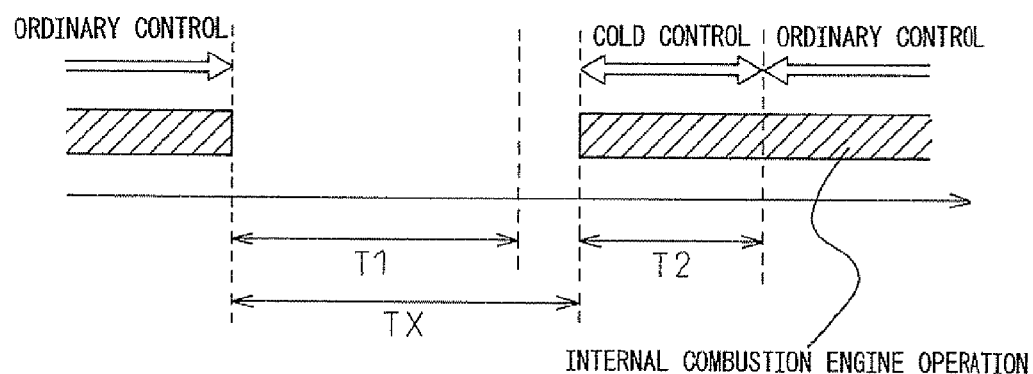

FIG. 23A and FIG. 23B are views schematically showing switching between ordinary control and cold control in accordance with the elapsed time in the present embodiment. In the present embodiment, the ECU 30 is used to calculate the elapsed time from when the internal combustion engine stops. Further, as shown in FIG. 23A, when the elapsed time TX from when the internal combustion engine stops to when it is restarted is the intake system temperature guarantee time T1 or less, the intake system temperature does not fall that much, so at the time of restart of the internal combustion engine, cold control is not performed—ordinary control is performed. Here, the intake system temperature guarantee time T1 is the time calculated in advance by experiments or calculations. Normally, it is the time by which the intake system temperature is maintained at a relatively high constant temperature or more even if the internal combustion engine is stopped.

On the other hand, as shown in FIG. 23B, when the elapsed time TX from when the internal combustion engine stops to when it is restarted is longer than the intake system temperature guarantee time T1, the intake system temperature falls, so at the time of restart of the internal combustion engine, cold control is performed. At this time, cold control is performed until the temperature rise guarantee time T2 elapses after the internal combustion engine has been restarted. Here, the temperature rise guarantee time T2 is the time calculated in advance by experiments or calculations. It is the time necessary for the intake system temperature to be sufficiently raised even when the intake system temperature is relatively low when the internal combustion engine is restarted.

According to the present embodiment, by switching between ordinary control and cold control in this way, it is possible to switch between ordinary control and cold control by a relatively low calculated load without providing a wall sensor 22.

Figure 24A:
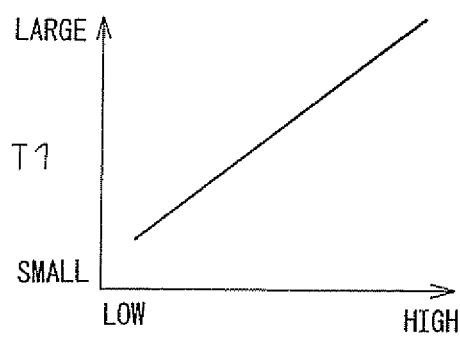
FIG. 24A and FIG. 24B are views showing relationships between an engine cooling water temperature and a temperature guarantee time and temperature rise guarantee time.
Figure 24B:
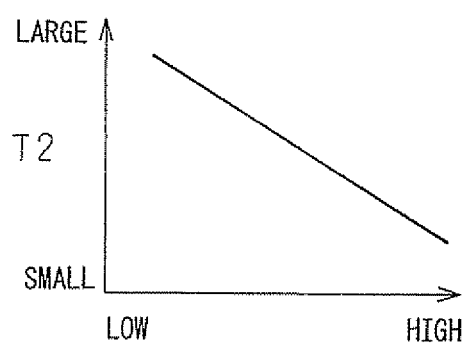

Note that, in the above embodiment, the temperature guarantee time T1 and temperature rise guarantee time T2 are made constant values. However, the higher the engine cooling water temperature at the time of engine stop, the time taken after the internal combustion engine is stopped to when the intake system wall surface temperature falls to a relatively high constant temperature or less becomes longer, so as shown in FIG. 24A, the temperature guarantee time T1 may be set longer the higher the engine cooling water temperature at the time of engine stop. Further, the higher the engine cooling water temperature at the time of engine restart, the shorter the time after restart of the internal combustion engine to when the intake system wall surface temperature rises to the warmup judgment temperature or more, so as shown in FIG. 24B, it is also possible to set the temperature rise guarantee time T2 shorter the higher the engine cooling water temperature at the time of engine restart.

Note that, the present invention was explained in detail based on specific embodiments, but a person skilled in the art could make various changes, corrections, etc. without departing from the scope of the claims and idea of the present invention.

The invention claimed is:

1. A spark ignition type internal combustion engine comprising a variable closing timing mechanism which is able to change a closing timing of an intake valve after suction bottom dead center and a throttle valve which is provided in an engine intake passage, wherein an amount of intake air fed into a combustion chamber is controlled mainly by changing the closing timing of the intake valve,
wherein at the time of engine cold operation, the closing timing of the intake valve is advanced compared with at the time of engine warm operation and, at that time, the throttle valve is reduced in opening degree.

2. A spark ignition type internal combustion engine as set forth in claim 1, wherein at the time of engine cold operation, the lower a wall surface temperature of an intake system, the greater the extent by which the closing timing of the intake valve is advanced compared with the time of engine warm operation.

3. A spark ignition type internal combustion engine as set forth in claim 2, which uses an engine cooling water temperature as a value which expresses said wall surface temperature of the intake system.

4. A spark ignition type internal combustion engine as set forth in claim 1, wherein at the time of engine cold operation, an extent by which the closing timing of the intake valve is advanced is larger in the case where the engine speed is low compared with the case where it is high.

5. A spark ignition type internal combustion engine as set forth in claim 1, wherein at the time of engine cold operation, an extent by which the closing timing of the intake valve is advanced is larger in the case where the engine load is low compared with the case where it is high.

6. A spark ignition type internal combustion engine as set forth in claim 1, wherein at the time of engine cold operation, an extent by which the closing timing of the intake valve is advanced is larger in the case where a vaporization rate of fuel which is fed to said internal combustion engine is low compared with when it is high.

7. A spark ignition type internal combustion engine as set forth in claim 1, further comprising a variable compression ratio mechanism which is able to change a mechanical compression ratio, wherein the engine reduces the mechanical compression ratio at the time of engine cold operation compared with the time of engine warm operation.

8. A spark ignition type internal combustion engine as set forth in claim 1 comprising a variable compression ratio mechanism which is able to change a mechanical compression ratio, wherein the engine raises the mechanical compression ratio at the time of engine low load operation compared with the time of engine high load operation.

9. A spark ignition type internal combustion engine as set forth in claim 8, wherein at the time of engine low load operation, the mechanical compression ratio is made the maximum mechanical compression ratio.

10. A spark ignition type internal combustion engine as set forth in claim 8, wherein at the time of engine low load operation, the expansion ratio is made 20 or more.

11. A spark ignition type internal combustion engine as set forth in claim 1, further comprising a cooling water flow path which circulates engine cooling water to a vicinity of at least part of the engine intake passage,
wherein the engine cooling water circulates through said cooling water flow path when the wall surface temperature of the intake system is lower than the engine cooling water temperature.

12. A spark ignition type internal combustion engine as set forth in claim 11, wherein engine cooling water is not allowed to be circulated to said cooling water flow path at the time of engine high load operation even when the wall surface temperature of the intake system is lower than the engine cooling water temperature.

13. A spark ignition type internal combustion engine as set forth in claim 1, further comprising an elapsed time calculating means for detecting the elapsed time from when the internal combustion engine is stopped to when it is restarted, wherein when said elapsed time which was detected by the elapsed time calculating means is shorter than a predetermined time, it is judged that the internal combustion engine after engine restart is in the middle of engine warm operation.

14. A spark ignition type internal combustion engine comprising a variable closing timing mechanism which is able to change a closing timing of an intake valve after suction bottom dead center and a throttle valve which is provided in an engine intake passage, wherein an amount of intake air fed into a combustion chamber which is controlled mainly by changing the closing timing of the intake valve,
wherein the closing timing of the intake valve is restricted to an advanced side from a retarded guard timing, the retarded guard timing at the time of engine cold operation is set to the advanced side compared with the time of engine warm operation, and, at the time of engine cold operation when the closing timing of the intake valve is advanced, the throttle valve is made smaller in opening degree.

15. A spark ignition type internal combustion engine as set forth in claim 14, wherein at the time of engine cold operation, the lower a wall surface temperature of an intake system, the more the retarded guard timing is set to the advanced side compared with the time of engine warm operation.

16. A spark ignition type internal combustion engine as set forth in claim 14, wherein at the time of engine cold operation, the retarded guard timing is set more to the advanced side when the engine speed is low compared to when it is high.

17. A spark ignition type internal combustion engine as set forth in claim 14, wherein at the time of engine cold operation, the retarded guard timing is set more to the advanced side when the engine load is low compared to when it is high.

18. A spark ignition type internal combustion engine as set forth in claim 14, wherein at the time of engine cold operation, the retarded guard timing is set more to the advanced side when a vaporization rate of fuel which is fed to said internal combustion engine is low compared to when it is high.

* * * * *